(12) United States Patent
Van Hall et al.

(10) Patent No.: US 10,669,599 B2
(45) Date of Patent: Jun. 2, 2020

(54) DECARBURIZED SELF-PIERCING RIVET

(71) Applicant: Colorado School of Mines, Golden, CO (US)

(72) Inventors: Stephen N. Van Hall, Golden, CO (US); Kip O. Findley, Arvada, CO (US)

(73) Assignee: Colorado School of Mines, Golden, CO (US)

(*) Notice: Subject to any disclaimer, the term of this patent is extended or adjusted under 35 U.S.C. 154(b) by 98 days.

(21) Appl. No.: 15/705,474

(22) Filed: Sep. 15, 2017

(65) Prior Publication Data

US 2018/0080096 A1 Mar. 22, 2018

Related U.S. Application Data

(60) Provisional application No. 62/395,731, filed on Sep. 16, 2016.

(51) Int. Cl.
| | |
|---|---|
| *C21D 8/00* | (2006.01) |
| *C21D 3/04* | (2006.01) |
| *F16B 19/08* | (2006.01) |
| *C21D 1/18* | (2006.01) |
| *B21J 15/02* | (2006.01) |
| *C21D 1/63* | (2006.01) |
| *B21J 15/00* | (2006.01) |
| *C21D 1/00* | (2006.01) |

(52) U.S. Cl.
CPC ............. *C21D 3/04* (2013.01); *B21J 15/025* (2013.01); *C21D 1/18* (2013.01); *C21D 1/63* (2013.01); *F16B 19/086* (2013.01); *C21D 2211/001* (2013.01)

(58) Field of Classification Search
CPC . B21J 15/025; C21D 1/18; C21D 1/63; C21D 2211/001; C21D 3/04
See application file for complete search history.

(56) References Cited

U.S. PATENT DOCUMENTS 8,070,406 B2  12/2011  Trinick

OTHER PUBLICATIONS

Stephen N. Van Hall et al, "Improved Self-Pierce Rivet Performance Through Intentional Decarburization", Journal of Materials Processing Tech., 251, (2018) 350-359, available online Aug. 31, 2017) (Year: 2018).*

(Continued)

*Primary Examiner* — Lois L Zheng
(74) *Attorney, Agent, or Firm* — Sheridan Ross P.C.

(57) ABSTRACT

A decarburized self-piercing rivet is provided that can join dissimilar sheets of material while reducing the likelihood of forming cracks during the riveting process. The decarburized self-piercing rivet has requisite hardness and column strength to pierce the sheets of material and also has a ferrite layer that improves ductility and performance of the rivet. The increase ductility reduces the likelihood of cracks forming during the riveting process. A manufacturing process is also provided that austentizing and decarburizes the rivet simultaneously in a salt pot furnace to reduce the need for any post-austentizing localized heat treatments.

8 Claims, 28 Drawing Sheets

(56) References Cited

OTHER PUBLICATIONS

"2017 and Later Model Year Light-Duty Vehicle Greenhouse Gas Emissions and Corporate Average Fuel Economy Standards," Federal Register, vol. 77, No. 199, 2012, pp. 62623-63200, retrieved from https://www.govinfo.gov/content/pkg/FR-2012-10-15/pdf/2012-21972.pdf.
Meschut et al., "Innovative and Highly Productive Joining Technologies for Multi-Material Lightweight Car Body Structures," Journal of Materials Engineering and Performance, vol. 23, 2014, pp. 1515-1523.
Oldenburg, "Warm Forming of Steels for Tailored Microstructure," Encyclopedia of Thermal Stresses, 2014, Springer Science and Business Media, Dordrecht, The Netherlands, pp. 6469-6479, abstract only.

\* cited by examiner

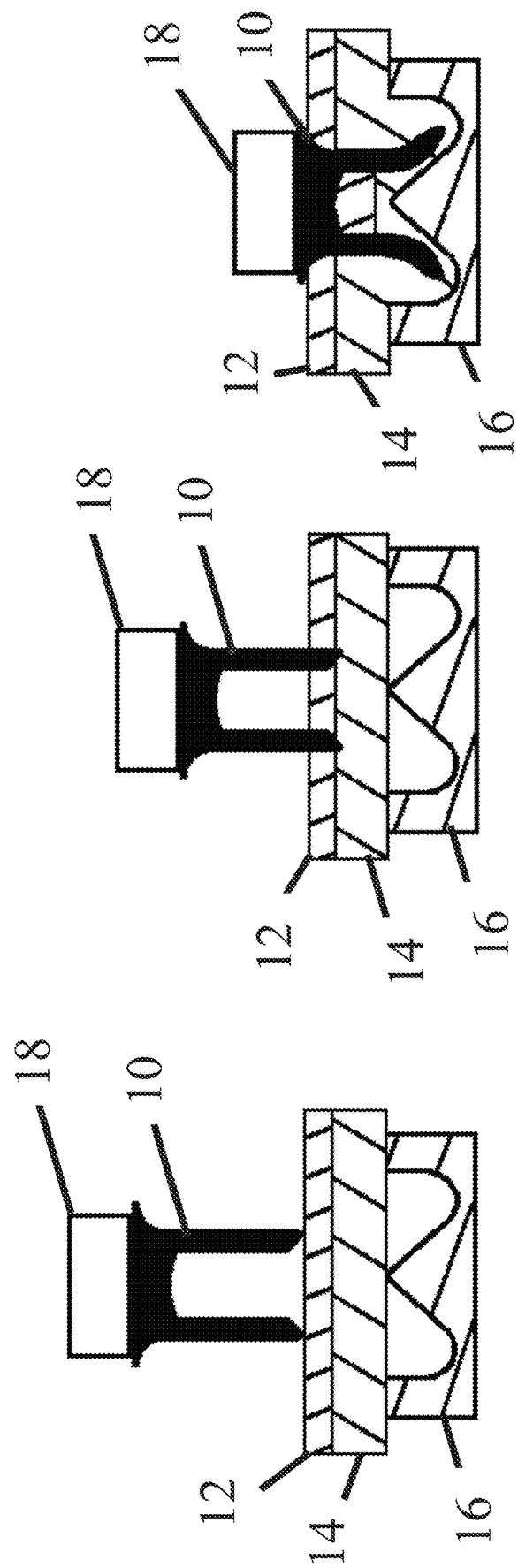

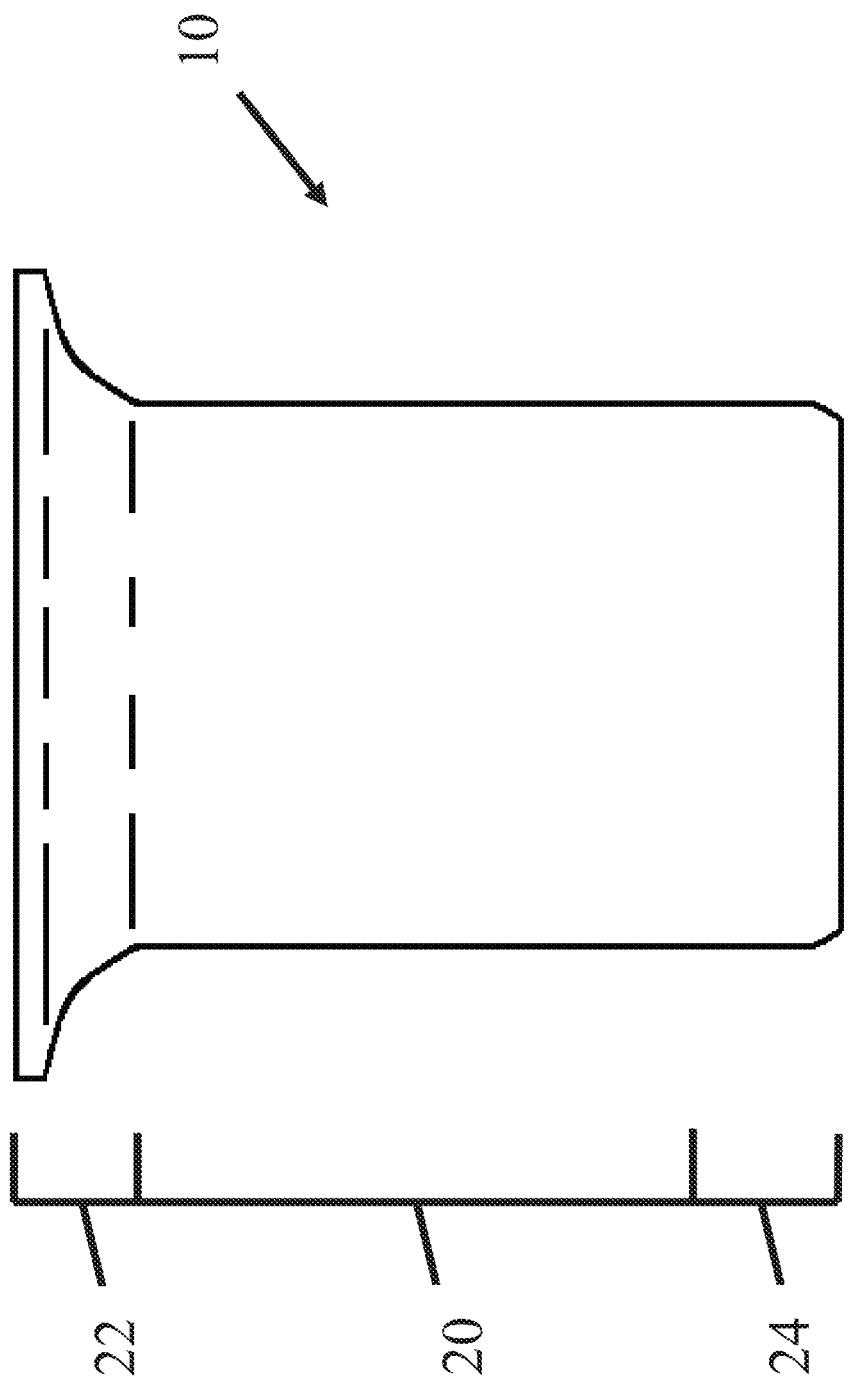

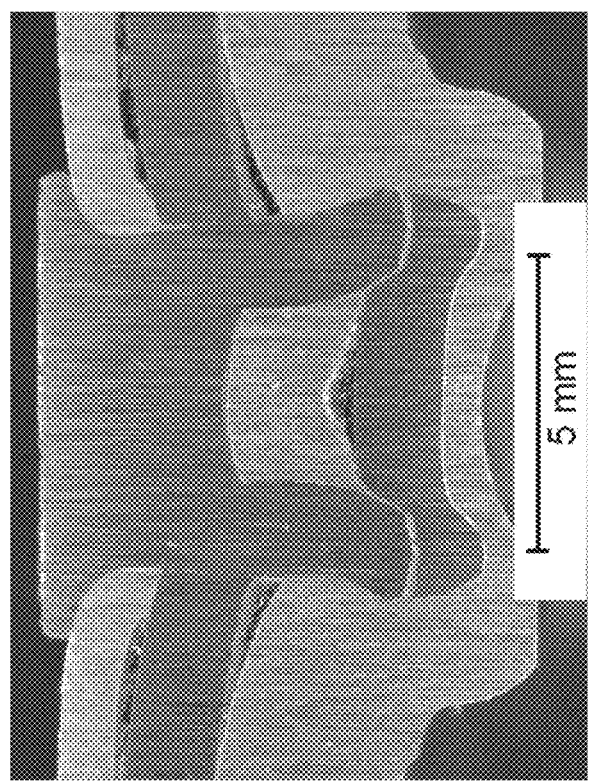
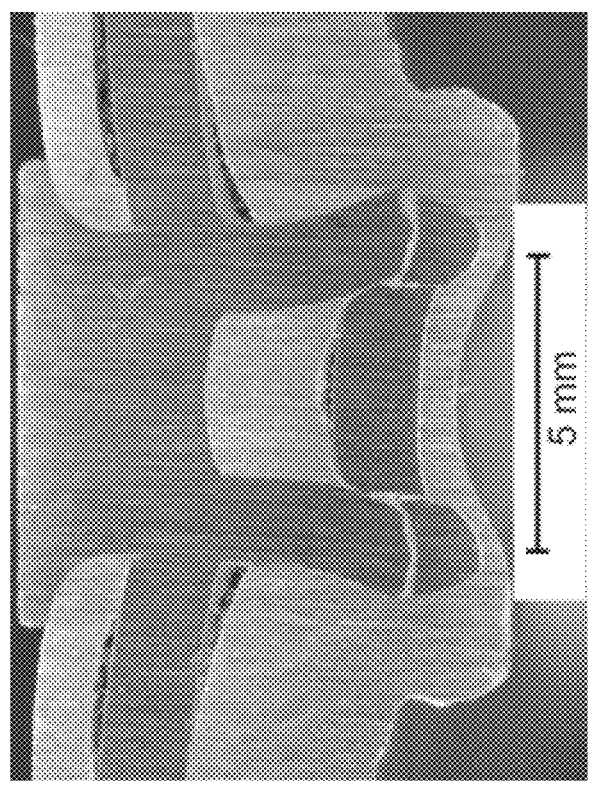

DECARBURIZED SELF-PIERCING RIVET

CROSS-REFERENCE TO RELATED APPLICATIONS

This application claims priority under 35 U.S.C. § 119(e) to U.S. Provisional Patent Application Ser. No. 62/395,731 filed Sep. 16, 2016, which is incorporated herein in its entirety by reference.

FIELD OF THE INVENTION

The present invention relates to decarburized rivets that have improved performance characteristics in a variety of applications, and processes for making and using the same.

BACKGROUND OF THE INVENTION

Self-piercing rivets are used in many different applications and industries. In particular, self-piercing rivets are used in the automotive industry to join and secure multiple sheets of materials. An ongoing trend in the automotive industry is to reduce the weight of vehicles to improve fuel efficiency and meet Corporate Average Fuel Economy ("CAFE") standards. As a result, modern vehicles have a variety of materials in addition to steel such as composites and aluminum to reduce weight. Thus, self-piercing rivets are used in vehicle production to join sheets of dissimilar materials.

To join dissimilar materials, self-piercing rivets in the automotive industry have a requisite hardness, which can be between 535 HV and 585 HV. These rivets are typically steel that has been austenized and then quenched in a bath to produce a hardened steel rivet with a martensite crystalline structure. These rivets can then be used to join sheets of material. However, one prevailing issue with hardened rivets is that the increased hardness leads to undesirable brittleness.

In practice, multiple sheets of material are positioned adjacent each other for the riveting process, a punch is on one side of the sheets, and a die is on the other side of the sheets. The self-piercing rivet is secured to the punch, which drives the rivet through the sheets and into the die. The die redirects the tail end of the rivet back onto the sheets to secure the rivet and the sheets together. This redirection deforms the tail end of the rivet in a process called flaring. Under some circumstances, flaring the tail end of the rivet causes cracks in the rivet due to the brittleness of the rivet. Cracks lead to integrity issues for the rivet and possibly failure. Therefore, there is a need for a self-piercing rivet that has the requisite hardness and column strength to join dissimilar sheets of materials, but also has qualities that avoid cracking during flaring and subsequent failure.

Another shortcoming of current rivet systems is the need to have many different rivet geometries and die combinations to accommodate the variety of materials that need to be joined in the automotive industry. Thus, there is also a need for a rivet that can join sheets to reduce the number of rivet geometries and die combinations, which reduces costs.

SUMMARY OF THE INVENTION

The various embodiments and configurations of the present invention address the above needs and other needs. The present invention relates to a self-piercing rivet that has a ferrite layer on an outer surface of the rivet that is more ductile than the remaining bulk material of the rivet, which can have martensite crystalline structure. Specifically, self-piercing rivets of the present invention retain requisite column strength, but have improved ductility due to the ferrite layer to reduce or eliminate the formation of cracks when the rivet is pressed into a die and deformed to join multiple sheets of material. In addition, the improved characteristics of the self-piercing rivet of the present invention allow for much greater flaring during joining and facilitate the use of longer than optimal rivets to form successful joints, thereby reducing the number of rivet and die combinations required for vehicle production, which reduces manufacturing costs.

It is an aspect of the present invention to provide a ferrite layer with specific physical characteristics and dimensions on a self-piercing rivet. For instance, the thickness of the ferrite layer can be between 20 and 40 microns. In addition, the volume fraction of the ferrite layer relative to, for example, the martensite crystalline structure of the remaining bulk material of the rivet can continuously decrease from an outer surface of the ferrite layer to an inner surface of the ferrite layer. At the inner surface of the ferrite layer, the ferrite crystalline structure fully transitions to the martensite crystalline structure. The martensite crystalline structure captures carbon to improve hardness, and the ferrite crystalline structure cannot capture as much carbon, which improves ductility.

It is another aspect of the present invention to provide a process and method for manufacturing a self-piercing rivet with a ferrite layer that austenitizing and decarburizing the rivet at the same time. Stated another way, embodiments of the present invention do not necessarily include a separate decarburizing step. In an exemplary embodiment, a self-piercing rivet is placed in a salt pot furnace at a temperature that induces an austenite crystalline structure and the presence of salt leaches carbon from the surface of the rivet, which ultimately produces a ferrite layer. The rivet is quenched in a bath to produce a martensite crystalline structure in the bulk material of the rivet and a ferrite layer on the outer surface of the rivet.

It is a further aspect of the present invention to provide a self-piercing rivet that can be made from a number of materials and can be used to join many different types of materials. Examples of materials for the rivet include, but are not limited to, 10B37 steel, 4340 steel, and 5160 steel. It will be appreciated that the self-piercing rivet can be made from any material that can increase ductility through the addition of a ferrite layer. The self-piercing rivet can join one or more sheets of material, and the material can include high strength steel, press-hardened steel, 6000 series aluminum, composites, etc. Again, it will be appreciated that the improvements to the self-piercing rivet described herein can be applied to any different type and number of materials.

It is yet another aspect of the present invention to provide a process and method for manufacturing a self-piercing rivet that optimizes the column strength of the rivet with the improved ductility added by the decarburizing step. As described above, the austenitizing and decarburizing steps occur simultaneously. However, the rivet experiences diminishing returns, i.e., less improvement to ductility, and the column strength starts to degrade the longer this step lasts. Therefore, embodiments of present invention described herein an optimized process or method that captures the desired improvement in ductility without sacrificing column strength. For example, a rivet may be austenitized and decarburized in a salt pot furnace for 60 minutes to optimize ductility and column strength.

One particular embodiment of the present invention is a self-piercing rivet, comprising a grip body having a first end and a second end, wherein at least a portion of the grip body has an inner, partially enclosed volume; a head portion positioned at the first end of the grip body; a tail portion positioned at the second end of the grip body, and the tail portion comprising a bulk material; and a ferrite layer of the tail portion, wherein the ferrite layer is located on an outer surface of the bulk material, and wherein the ferrite layer has a carbon content that is less than a carbon content of the bulk material such that the ferrite layer is more ductile than the bulk material.

In some embodiments, a thickness of the ferrite layer is between approximately 20 to 40 microns. In various embodiments, a volume fraction of ferrite continuously decreases from an outer surface of the ferrite layer to an inner surface of the ferrite layer. In some embodiments, the bulk material is one of a 10B37 steel, a 4340 steel, and a 5160 steel. In various embodiments, the ferrite layer is formed from a decarburization process applied to the bulk material. In some embodiments, the bulk material is more than 50% martensite by volume.

Another particular embodiment of the present invention is a method of manufacturing a self-piercing rivet, comprising (i) providing a rivet having a grip body, a head portion, and a tail portion, wherein an outer layer of the tail portion has a first carbon content; (ii) placing the rivet in a furnace at a predetermined temperature of between about 800 and 900° C.; (iii) austentizing and decarburizing the rivet in the furnace at the predetermined temperature such that the outer layer of the tail portion has a second carbon content that is lower than the first carbon content; (iv) removing the rivet from the furnace after a predetermined time of between about 20 and 240 minutes; and (v) quenching the rivet in a bath such that the outer layer of the rivet has a volume fraction of ferrite and a remaining bulk material of the rivet is more than 50% martensite by volume.

In various embodiments, the furnace is a salt pot furnace. In some embodiments, the salt pot furnace has a salt mixture of approximately 90% barium chloride and approximately 10% sodium chloride. In various embodiments, the method further comprises (vi) tempering the rivet at a second predetermined temperature of between about 150 and 400° C. for a second predetermined time of between about 20 and 40 minutes. In some embodiments, the method further comprises (vii) applying an acetone wash to the rivet to remove salt. In various embodiments, the bulk material and the outer layer of the rivet are at least one of a 10B37 steel and a 4340 steel, and the second predetermined temperature for tempering is between about 150 to 250° C., and the second predetermined time is approximately about 20 to 40 minutes.

In some embodiments, the bulk material and the outer layer of the rivet is a 5160 steel, and the second predetermined temperature for tempering is approximately about 300 to 400° C., and the second predetermined time is approximately about 20 to 40 minutes. In various embodiments, the predetermined time for austentizing and decarburizing is between about 50 to 70 minutes.

Yet another particular embodiments of the present invention is a method of joining a first sheet and a second sheet with a self-piercing rivet, comprising (i) providing a first sheet and a second sheet; (ii) providing a rivet having a bulk material with a first carbon content; (iii) decarburizing the rivet for a predetermined time of between about 20 and 240 minutes at a predetermined temperature of between about 800 and 900° C. to produce a ferrite layer on an outer surface of the decarburized rivet, the ferrite layer having a second carbon content that is lower than the first carbon content; (iv) piercing the decarburized rivet through the first sheet and second sheet into a die; (v) flaring a leg of the decarburized rivet in the die to join the first sheet and the second sheet with the decarburized rivet.

In some embodiments, the first sheet is press hardened steel and the second sheet is an aluminum material. In various embodiments, the rivet is one of a 10B37 steel, a 4340 steel, and a 5160 steel. In some embodiments, the decarburization process is conducted in a salt pot furnace with a salt mixture of approximately 90% barium chloride and approximately 10% sodium chloride. In various embodiments, a thickness of the ferrite layer is between approximately 20 to 40 microns. In some embodiments, a volume fraction of ferrite continuously decreases from an outer surface of the ferrite layer to an inner surface of the ferrite layer.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements or components. Additional aspects of the present invention will become more readily apparent from the Detailed Description, particularly when taken together with the drawings.

The above-described embodiments, objectives, and configurations are neither complete nor exhaustive. As will be appreciated, other embodiments of the invention are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

BRIEF DESCRIPTION OF THE DRAWINGS

The accompanying drawings, which are incorporated in and constitute a part of the specification, illustrate embodiments of the invention and together with the Summary of the Invention given above and the Detailed Description of the drawings given below, serve to explain the principles of these embodiments. In certain instances, details that are not necessary for an understanding of the invention or that render other details difficult to perceive may have been omitted. It should be understood, of course, that the invention is not necessarily limited to the particular embodiments illustrated herein. Additionally, it should be understood that the drawings are not necessarily to scale.

FIGS. 1A-1C are a sequence of cross-sectional views showing a decarburized self-piercing rivet driven into sheets of material and a die;

FIG. 2A is a front elevation view of a decarburized self-piercing rivet;

FIG. 14A is a cross-sectional view of a 10B37 steel rivet joining sheets of materials, wherein the rivet has not been subjected to a decarburization treatment;

FIG. 14B is a cross-sectional view of a 10B37 steel rivet joining sheets of materials, wherein the rivet has been subjected to a decarburization treatment;

Figure 2B:
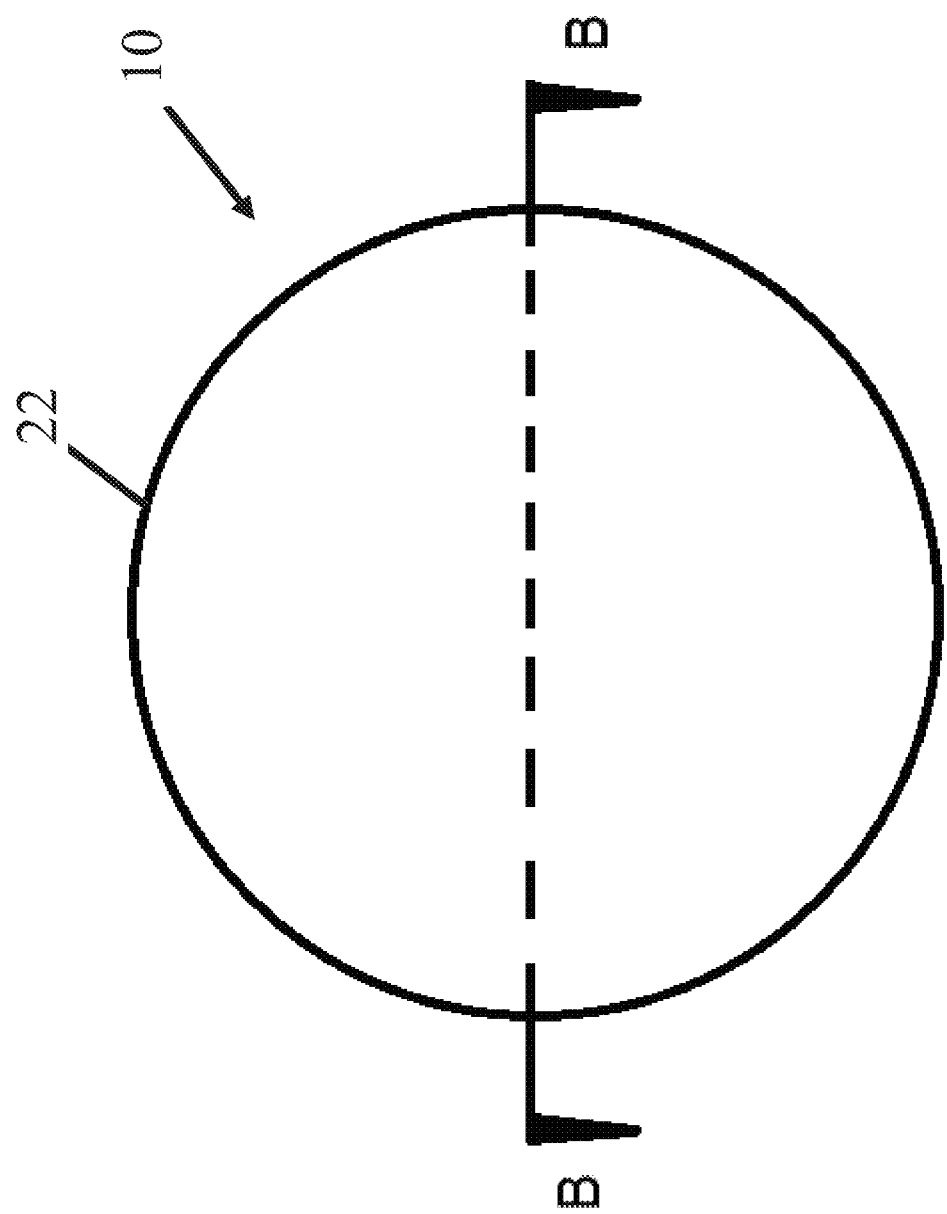
FIG. 2B is a top plan view of the decarburized self-piercing rivet in FIG. 2A.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

A list of the various components shown in the drawings and associated numbering is provided herein:

Number Component
- 10 Rivet
- 12 First Sheet
- 14 Second Sheet
- 16 Die
- 18 Punch
- 20 Body
- 22 Head
- 24 Tail
- 26 Volume
- 28 Ferrite Layer
- 30 Layer Thickness
- 32 Martensite
- 34 Placing Step
- 36 Austentizing, Decarburizing Step
- 38 Removing Step
- 40 Quenching Step
- 42 Cleaning Step
- 44 Washing Step
- 46 Scrubbing Step
- 48 Tempering Step
- 50 Utilizing Step

DETAILED DESCRIPTION

The present invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the invention.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments of the present invention are described herein and as depicted in the drawings. It is expressly understood that although the figures depict rivets and methods and systems for using the same, the present invention is not limited to these embodiments.

Now referring to FIGS. 1A-1C, a sequence of cross-sectional views showing a punch 18 driving a rivet 10 through multiple sheets 12, 14 of material is provided. The sheets 14, 16 are placed on a die 16, and the rivet 10 is secured to the punch 18. Then, the punch 18 drives the rivet 10 through sheets 14, 16 and into the die 16. The tail end of the rivet 10 deforms as material is pressed into the die 16, and the deformation secures the rivet 10 and the sheets 14, 16 together. While self-piercing rivets 10 are described herein, embodiments of the invention can also include rivets that are driven through pilot holes in the sheets 14, 16.

Figure 2C:
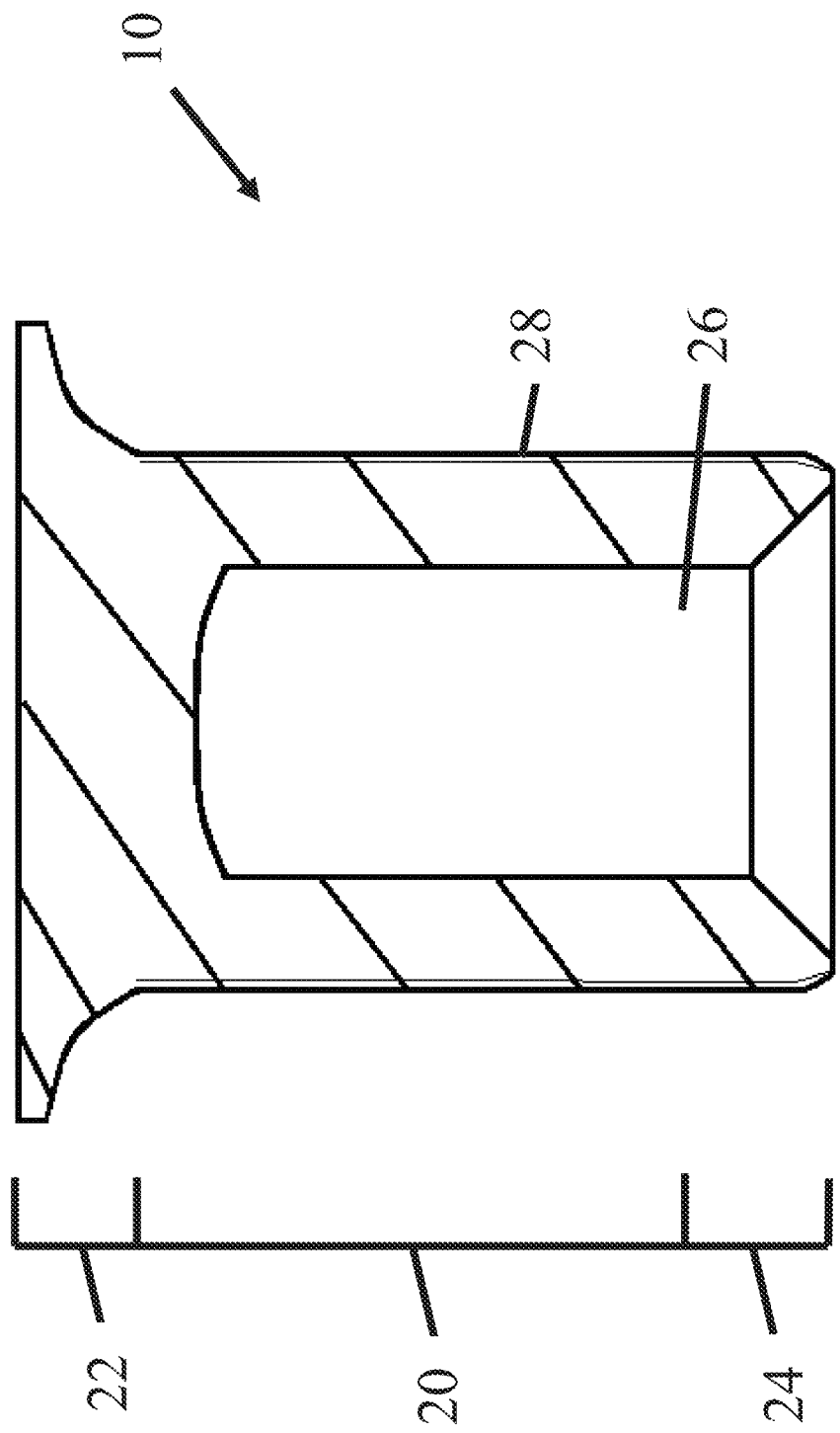
FIG. 2C is a cross-sectional view of the decarburized self-piercing rivet in FIG. 2B taken along line B-B.

Now referring to FIGS. 2A-2C, a sequence of views of a decarburized, self-piercing rivet 10 are provided. FIG. 2A is a front elevation view of the rivet 10, which has a body 20, a head 22 positioned at one end of the body 20, and a tail 24 positioned at an opposing end of the body 20. FIG. 2B is a top plan view of the rivet 10 in FIG. 2A, and a line B-B is provided. FIG. 2C is a cross-sectional view of the rivet 10 taken along line B-B in FIG. 2B. The body 20 and the tail 24 of the rivet 10 define an interior volume 26 that is configured to receive portions of the sheets as the rivet is driven through the sheets. Also shown in FIG. 2C is a ferrite layer 28 positioned on an outer surface of the rivet 10.

Figure 3A:
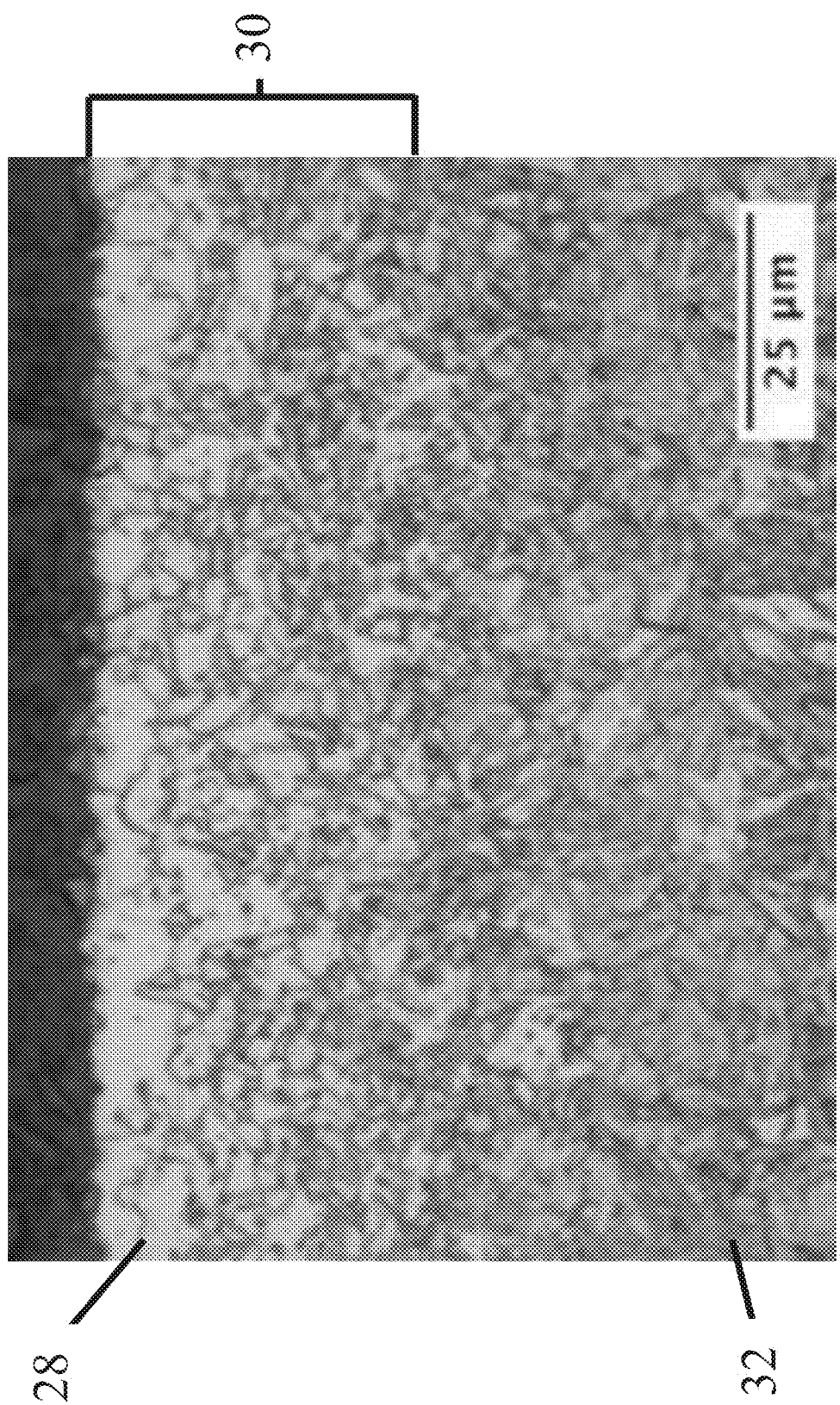
FIG. 3A is a cross-sectional view of a decarburized self-piercing rivet that has a ferrite layer on an outer surface of the rivet.
Figure 3B:
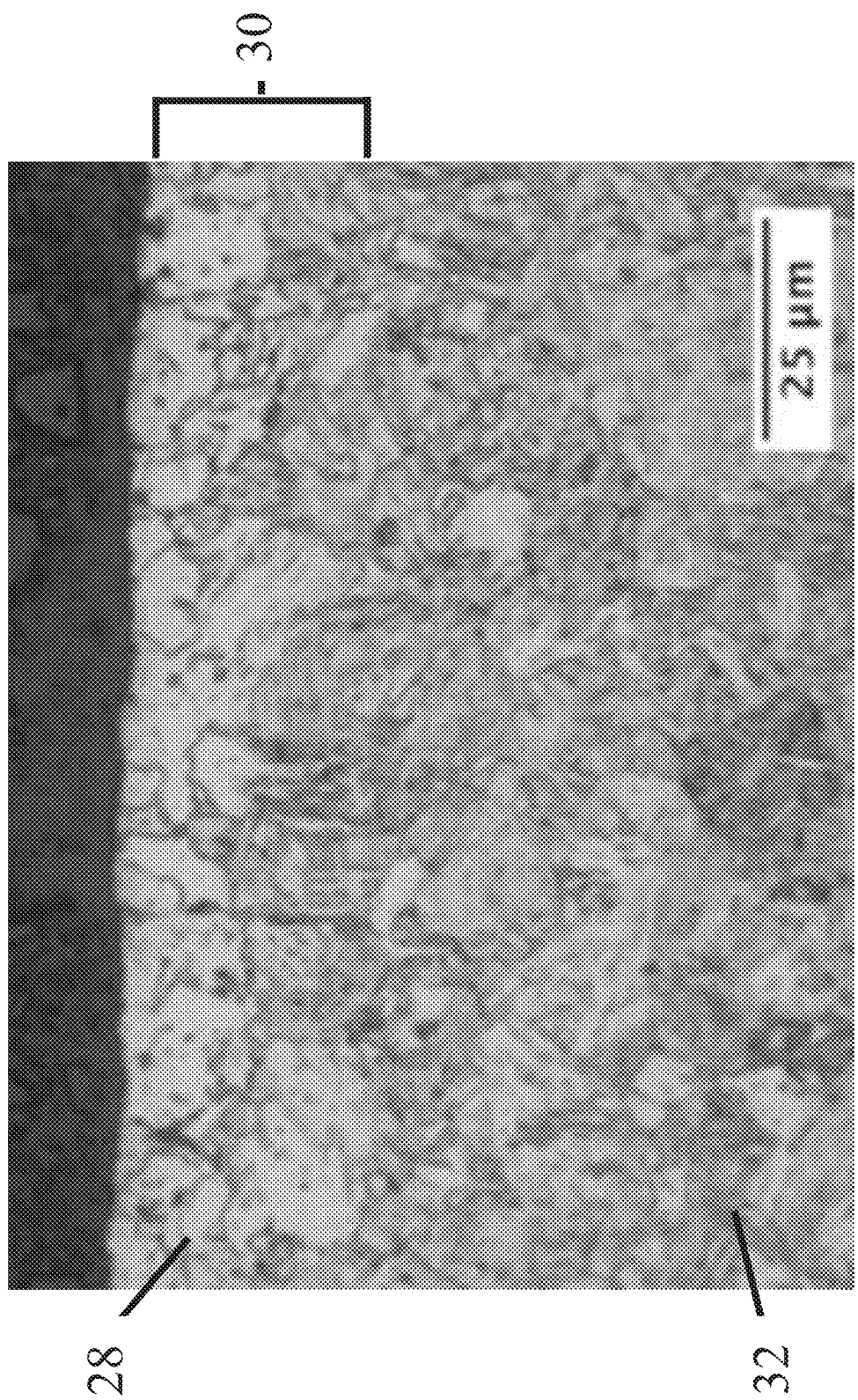
FIG. 3B is a cross-sectional view of a decarburized self-piercing rivet that has a ferrite layer on an outer surface of the rivet.
Figure 3C:
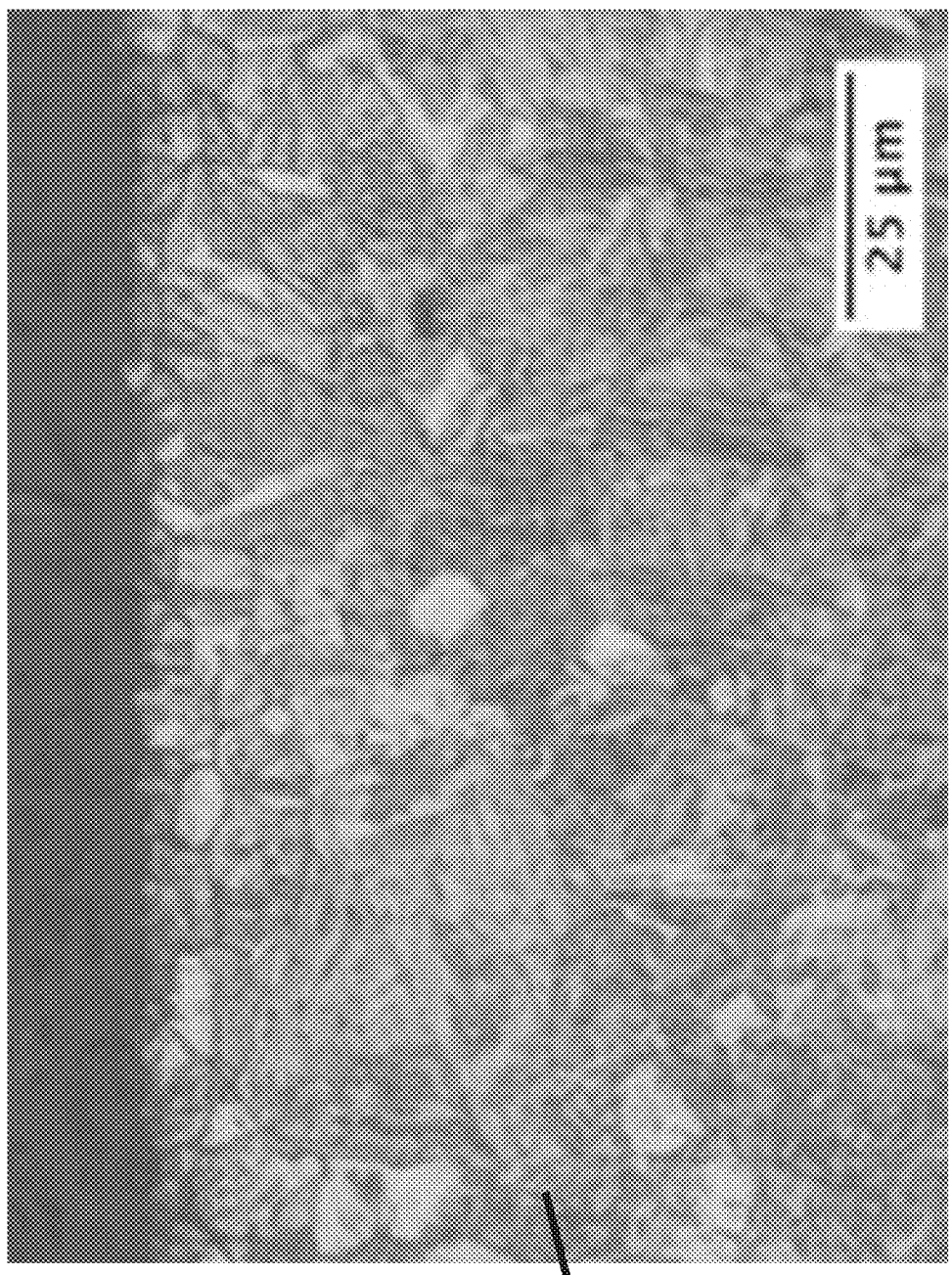
FIG. 3C is a cross-sectional view of a rivet that has a martensite crystalline structure.

Now referring to FIGS. 3A-3C, cross-sectional views of the outer layers of the rivet 10 showing crystalline structure of the rivet 10 are provided. FIG. 3A is a cross-sectional view of a 10B37 steel rivet 10 that has been decarburized. The rivet 10 has a ferrite layer 28 and a martensite layer 32, and the ferrite layer 28 is approximately 20-40 microns thick. Martensite is formed by the quenching of iron from austenite at such a rapid rate that carbon atoms cannot diffuse out of the crystalline structure. As a result of the quenching, the face-centered cubic austenite transforms to a highly strained body-centered tetragonal form called martensite that is supersaturated with carbon. Ferrite is a body-centered cubic form of iron, and in contrast to martensite, ferrite can only dissolve small amounts of carbon. This decarburized state provides ferrite with increased ductility. FIG. 3B shows a 5160 steel rivet 10 that has been decarburized and that has a 20-40 micro thick layer of ferrite 28. The remaining bulk material is martensite 32. FIG. 3C shows a 4340 steel rivet that has only a martensite 32 crystalline structure.

Figure 4:
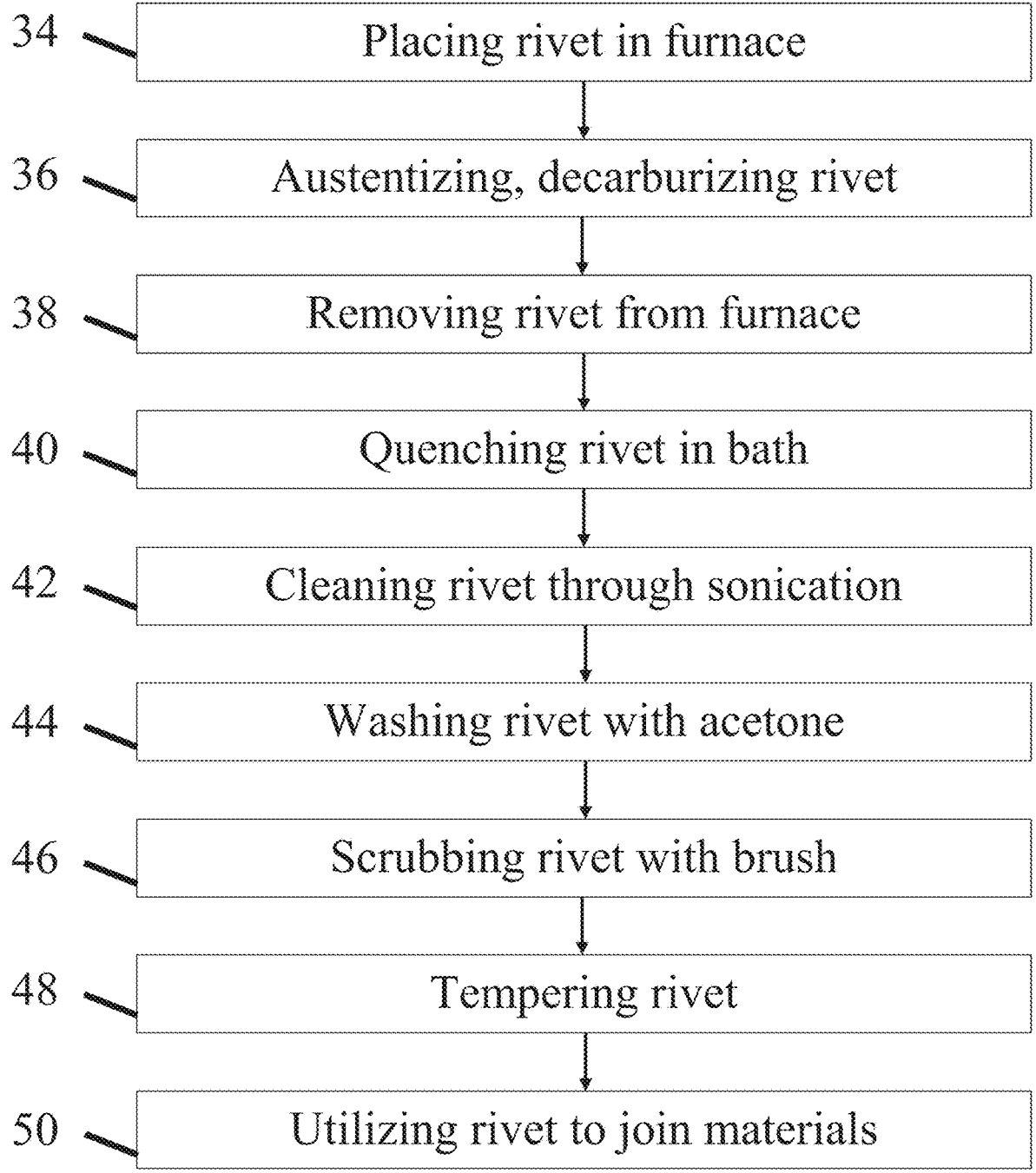
FIG. 4 is a flow chart depicting a process for manufacturing a decarburized self-piercing rivet.

Now referring to FIG. 4, a flow chart showing an exemplary process for manufacturing and utilizing a decarburized self-piercing rivet is provided. First, the rivet 10 is placed 34 into a furnace. In some embodiments of the process, the furnace is a salt pot furnace having a mixture of approximately 90% barium chloride and approximately 10% sodium chloride. The temperature of the furnace can range between 800 and 900° C. While in the furnace, the rivet is austentized and decarburized 36 simultaneously. After a period of time between approximately 20 and 240 minutes, the rivet is removed 38 from the furnace. The rivet is quenched 40 in a bath, for example an oil bath, to rapidly reduce the temperature of the rivet and form the martensite crystalline structure in the bulk material of the rivet. In post-processing steps, the rivet can be cleaned 42 with sonication, washed 44 with acetone, and scrubbed 46 with a wire brush.

After cleaning, the rivet can be tempered 48 reduce some hardness and increase the toughness of the rivet. In some embodiments, the rivet is tempered at a temperature between 150 and 400° C. for between 20 and 40 minutes. Then, the rivet can be utilized 50 to join multiple sheets of materials. It will be appreciated that one or more of these steps can be omitted or repeated in any order. In various embodiments, the rivet may be made from one of 10B37 steel, 4340 steel, and 5160 steel. However, it will be appreciated that the rivet can be made from any material that incurs the benefits of the treatments and processes described herein.

FIGS. 5-13B depict charts and perspective views of rivets from a mechanical flaring study. As described above, the tail end of rivets deforms and flares during the joining process. For the mechanical flaring study, rivets having different materials and different decarburizing processes are tested until failure to discern differences in performance. Different testing systems are also used to flare the rivets until failure, including a 120° conical die, a 3/16" (4.763 mm) ball bearing, and a 0.5" (12.7 mm) ball bearing.

Figure 5:
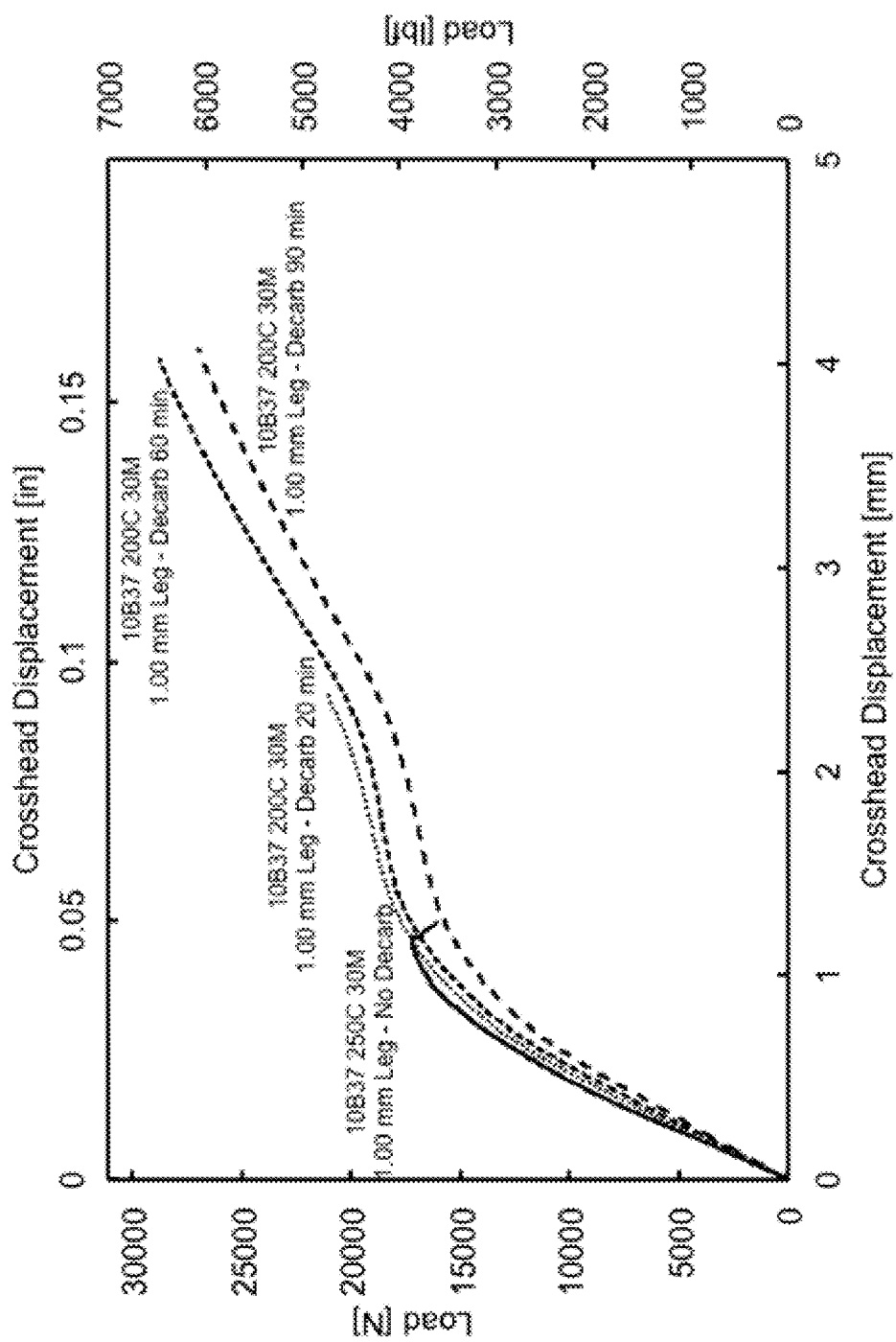
FIG. 5 is a chart depicting a mechanical flaring curve for 10B37 steel, 1 mm leg rivets, wherein the rivets have different decarburization treatments and the rivet is flared with a 120° conical die.
Figure 6:
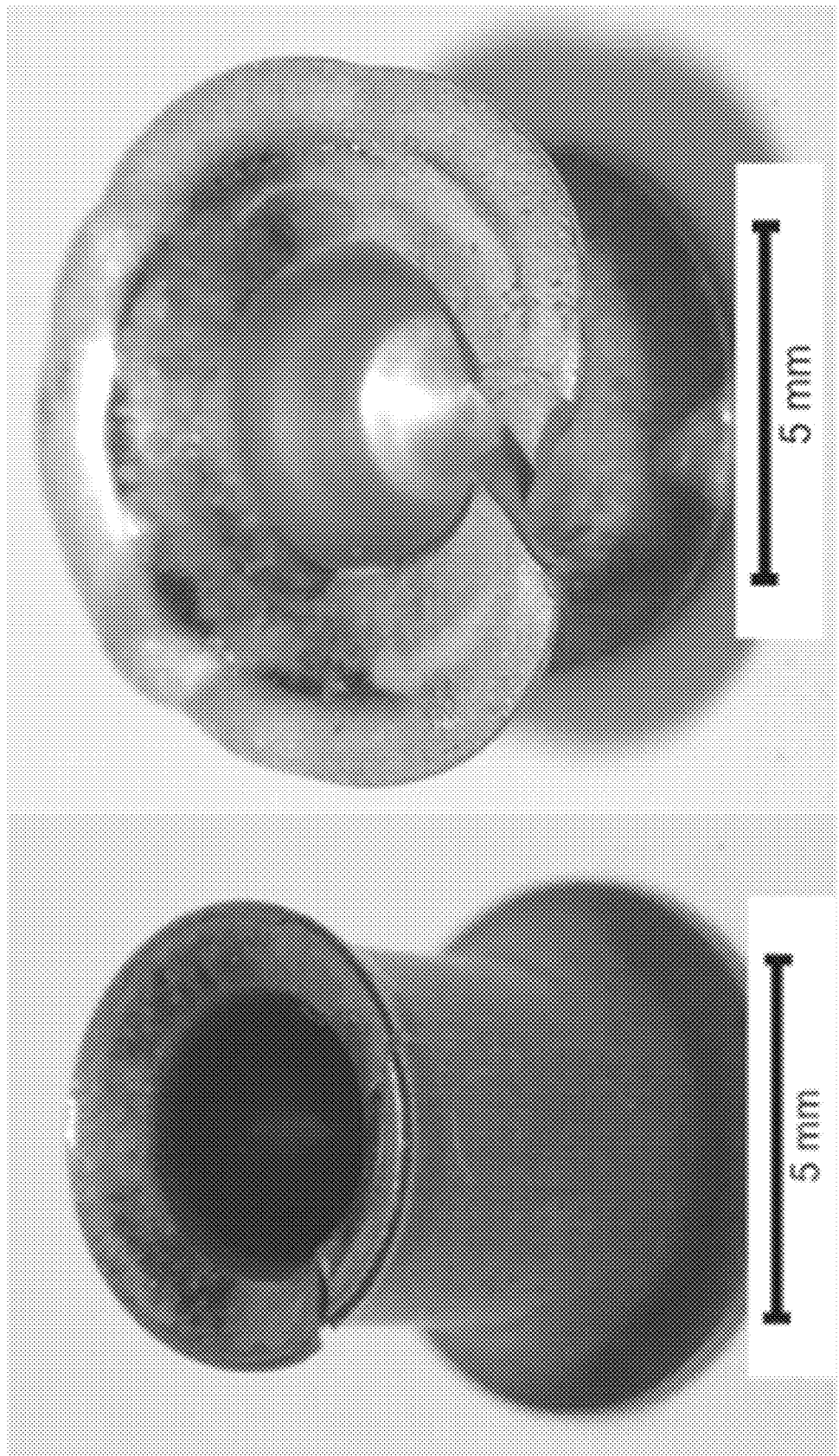
FIG. 6A is a perspective view of a 10B37 steel, 1 mm leg rivet that has not been subjected to a decarburization treatment, wherein the rivet has been flared to failure.
FIG. 6B is a perspective view of a 10B37, 1 mm leg steel rivet that has been subjected to a decarburization treatment, wherein the rivet has been flared to failure.

Now referring to FIG. 5, a chart depicting a mechanical flaring curve for 10B37 steel, 1 mm leg rivets is provided. The rivets were heat-treated to levels of varying decarburization and compared to a rivet with no decarburization. The rivets were flared until failure using a 120° conical die. Load versus crosshead displacement flaring curves for each rivet are shown in FIG. 5. There are two distinct regions of the curve for all tested conditions, analogous to an initial elastic region with a yield point and then increasing load as the die penetrates further up the rivet and samples a larger leg cross section. Both the load and crosshead displacement to failure increase as decarburized, ferrite layer thickness increases. Maximum column strength to hole-expansion ratio is achieved after 60 minutes of decarburization, where no additional hole-expansion performance is gained through further decarburization. After increased decarburization time in the 90 minute sample, there appears to be a decrease in column strength when compared to the 60 minute sample through the duration of the test. Due to the large increase in performance in each decarburized condition over the non-decarburized samples, the mechanical properties of the surface decarburized region to play a large role in flaring ability of rivets. As a result, a composite structure can be developed where the column strength of the rivet is provided by the bulk martensitic crystalline structure, and the hole-expansion fracture toughness is significantly improved by integrating a layer of ferrite at the region of highest tensile strain. The crosshead displacement to failure increased by a factor of 3.2 when 60 minutes of decarburizing was applied.

Now referring to FIGS. 6A and 6B, perspective views of 10B37 steel, 1 mm leg rivets are provided without a decarburization and with a decarburization treatment, respectively. The rivet out treatment show in FIG. 6A multiple small fractures around the circumference of the rivet tail, while rivets with a 60 minute decarburization treatment, as shown in FIG. 6B, had a single large crack propagating completely through the rivet leg and evidence of non-uniform deformation, which can be related to necking at specific locations around the circumference of the rivet tail. Thus, the decarburized rivet had a significant improvement in hole-expansion until the ultimate failure of the rivet.

Figure 7:
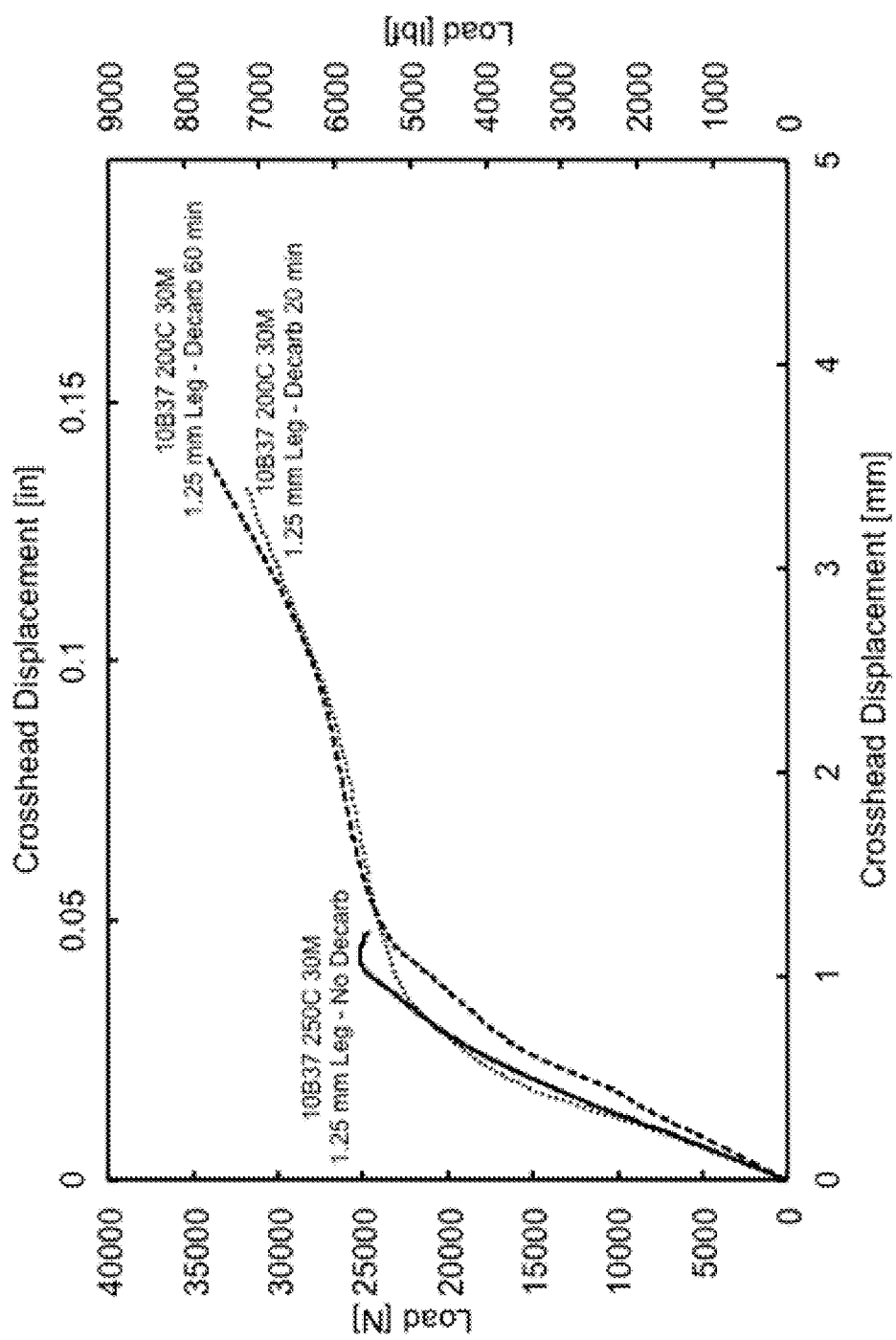
FIG. 7 is a chart depicting a mechanical flaring curve for 10B37, 1.25 mm leg steel rivets, wherein the rivets have different decarburization treatments and the rivet is flared with a 120° conical die.

Now referring to FIG. 7, a chart depicting a mechanical flaring curve for 10B37 steel, 1.25 mm leg rivets is provided. These rivets were also flared using a 120° conical die, and the trends are similar to the 1 mm leg rivets where the decarburized rivets show improvement in both crosshead displacement and load at failure, and further decarburization results in increased rivet tail deformation during loading. There appears to be a maximum in terms of column strength and hole expansion after decarburizing for 20 minutes, where there is increasing plastic deformation within the rivet as column strength is reduced with no large improvement in hole-expansion. The crosshead displacement to failure increased by a factor of 2.9 when 60 minutes of decarburizing was applied.

Figure 8:
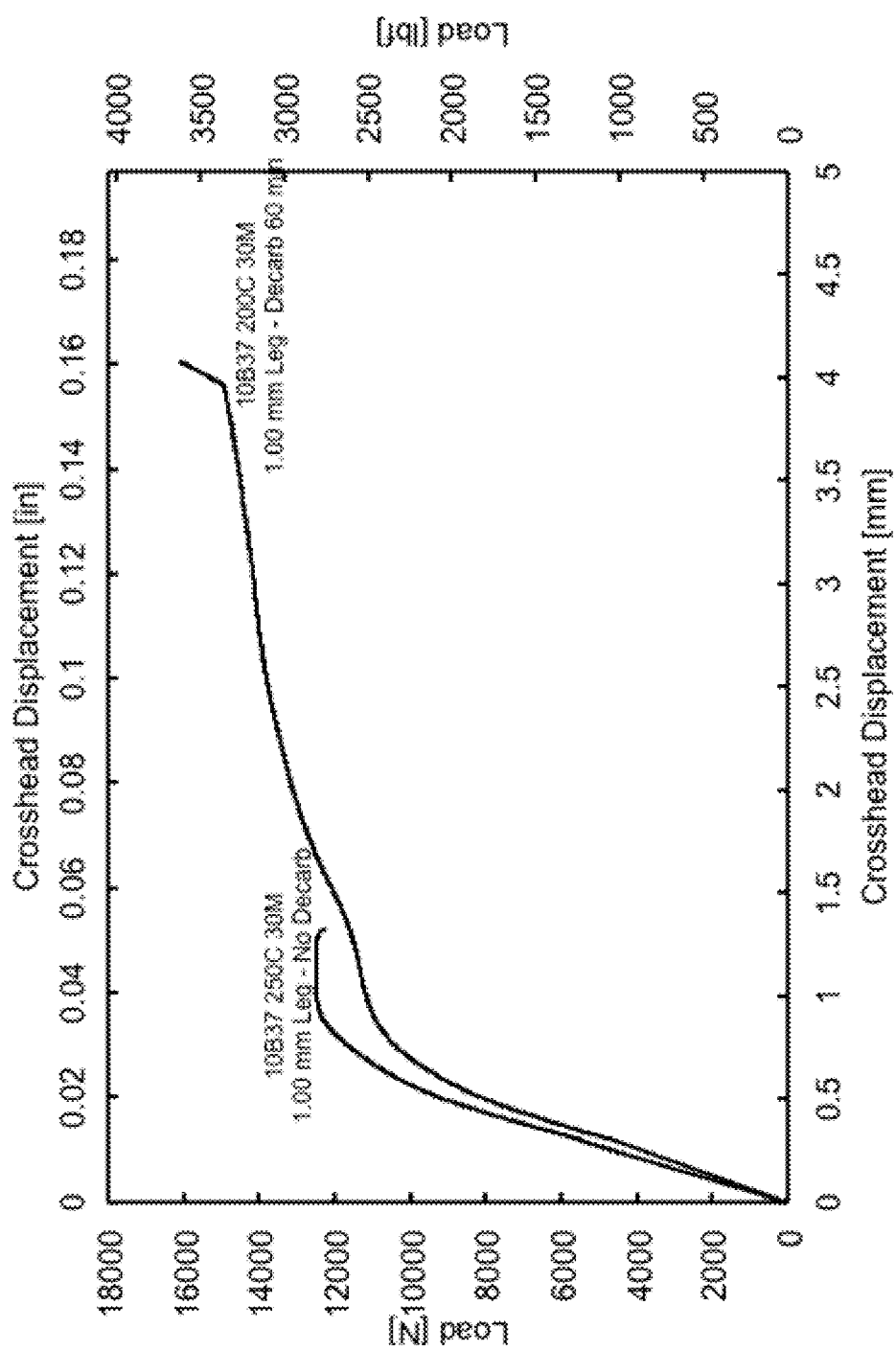
FIG. 8 is a chart depicting a mechanical flaring curve for 10B37 steel, 1 mm leg rivets, wherein the rivets have different decarburization treatments and the rivet is flared with a 3/16" ball bearing.

Now referring to FIG. 8, a chart depicting a mechanical flaring curve for 10B37 steel, 1 mm leg rivets is provided, but the rivets were flared using 3/16" ball bearing. The same types of improvements in crosshead displacement to failure were noted along with a reduction in column strength when compared to non-decarburized rivets. This reduction in column strength may be a result of the decarburized layer thickness decreasing the cross-sectional area of martensite at the rivet tail, leading to higher plastic deformation at a constant load. The ball bearing was able to fully penetrate the bore of the rivets that had been decarburized for 60 minutes, resulting in a load jump once the threaded rod compressing the ball bearing interacted with the rivet. No fractures were noted during flaring of the decarburized rivets.

Figure 9:
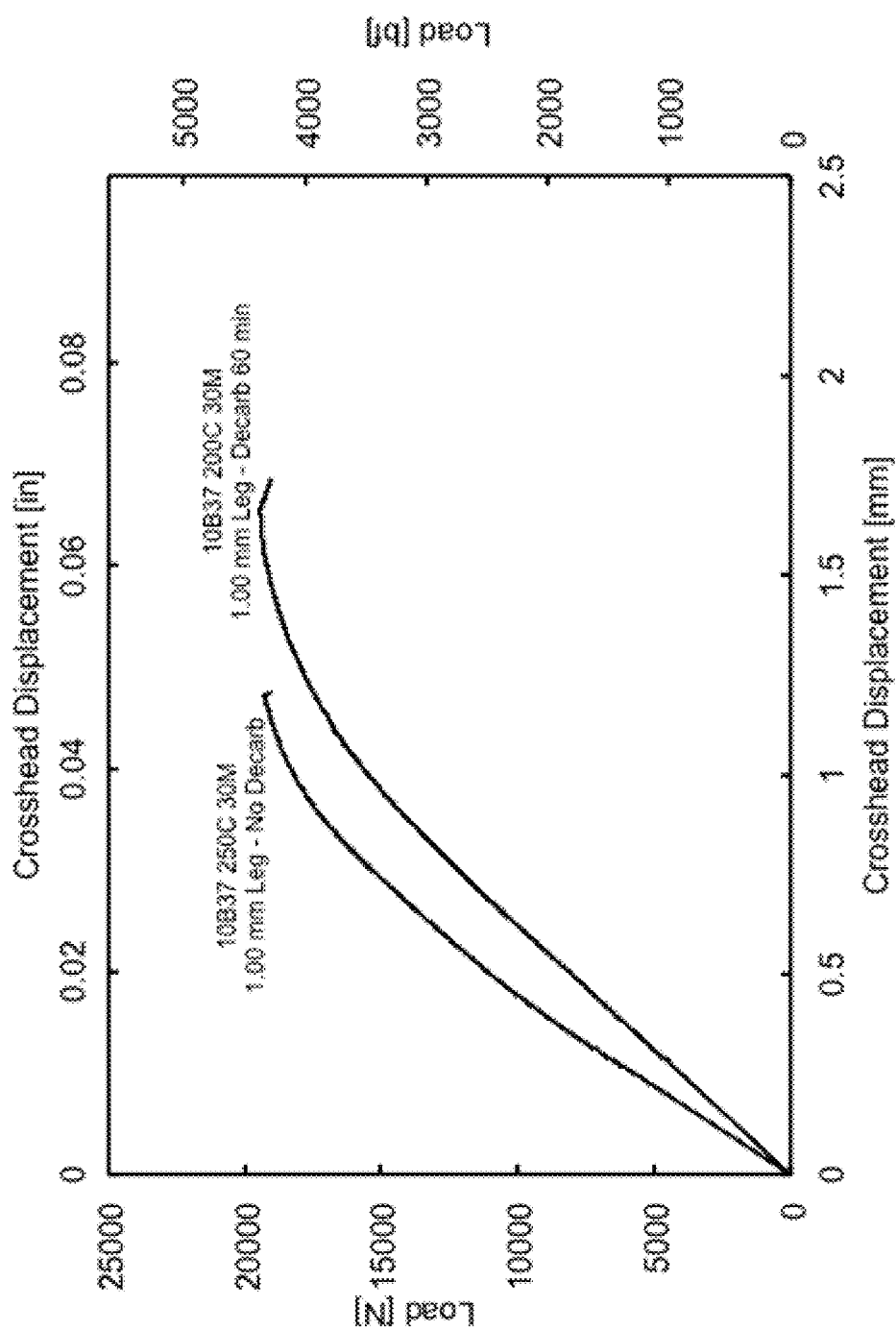
FIG. 9 is a chart depicting a mechanical flaring curve for 10B37 steel, 1 mm leg rivets, wherein the rivets have different decarburization treatments and the rivet is flared with a 1/2" ball bearing.

Now referring to FIG. 9, a chart depicting a mechanical flaring curve for 10B37 steel, 1 mm leg rivets is provided, but the rivets were flared using 1/2" ball bearing. Similar trends are noted to previous trials where the decarburized rivet shows increased crosshead displacement at failure. However, crosshead displacement to failure was reduced when compared to other strain paths. This may be due to an increased amount of plastic deformation and hoop strain evolved early in the test due to the contact area and rivet tail geometry. The increased plastic deformation may be a result of the reduced cross-sectional area in the rivet tail compressing as contact with the die is increased. Since the tangent at the area of contact provides a higher degree of hoop strain at low amounts of crosshead displacement, total crosshead displacement to failure is reduced.

Figure 10:
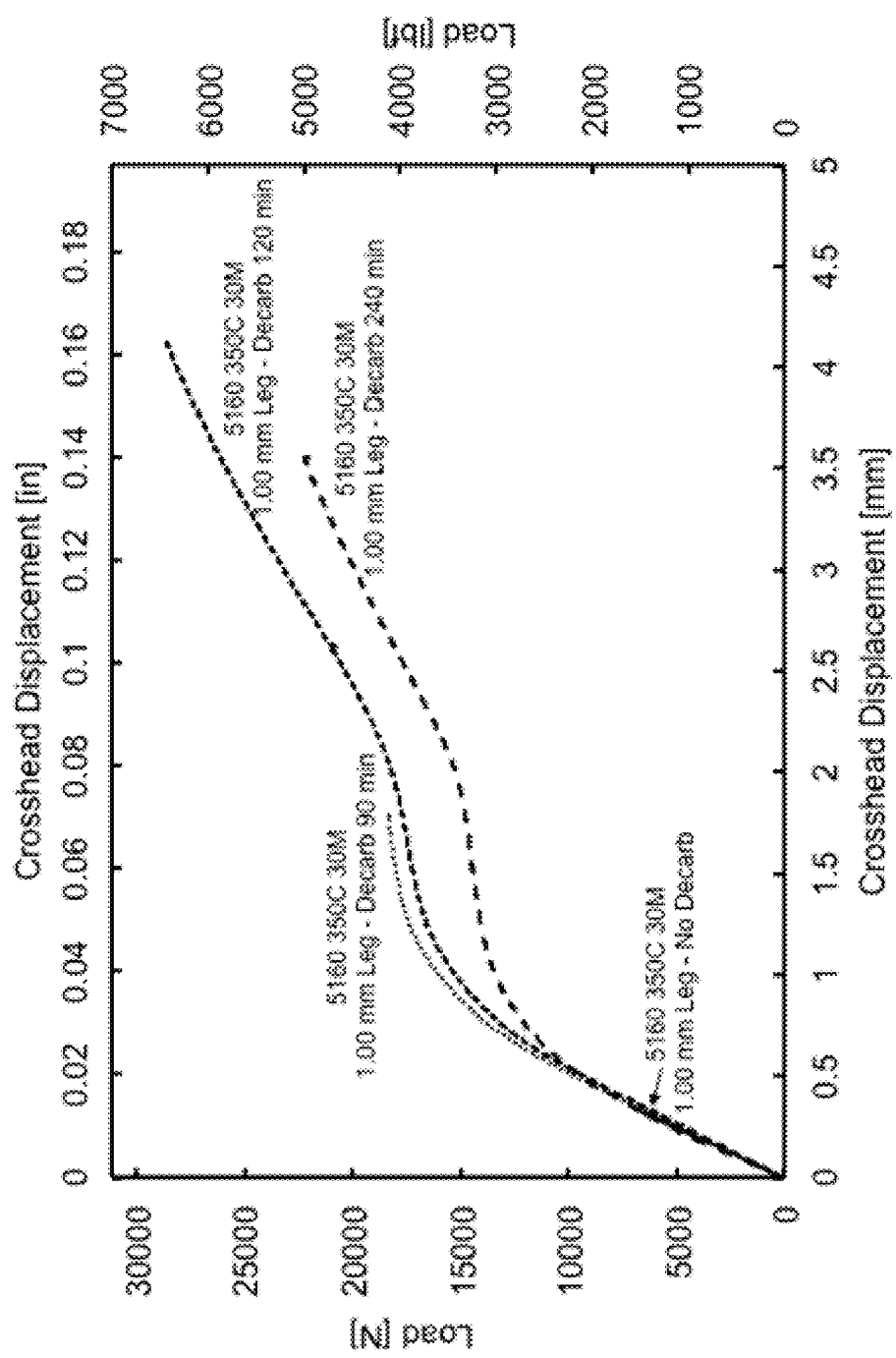
FIG. 10 is a chart depicting a mechanical flaring curve for 5160 steel, 1 mm leg rivets, wherein the rivets have different decarburization treatments and the rivet is flared with a 120° conical die.

Now referring to FIG. 10, a chart depicting a mechanical flaring curve for 5160 steel, 1 mm leg rivets is provided, and the rivets were flared using a 120° conical die. The results were similar to the flaring results for the 10B37 steel rivets flared using a 120° conical die. The rivets were heat-treated to varying levels of decarburization and showed performance increases over those rivets with no decarburization, including improvements in both crosshead displacement and load to failure. The rivets with no decarburization exhibited brittle failure with low load and crosshead displacement at failure. A drop in column strength while maintaining hole expansion performance at the longest decarburization times was noted in a similar manner to 10B37 steel rivets.

Figure 11B:
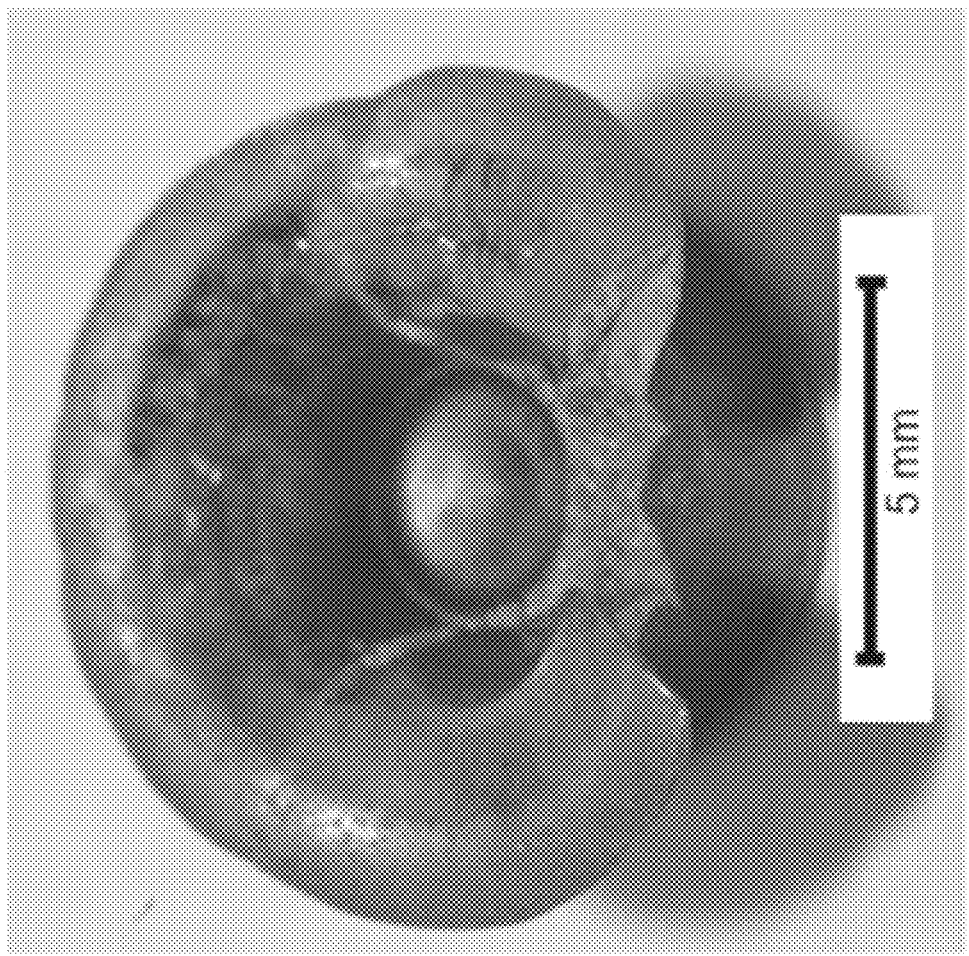
FIG. 11B is a perspective view of a 5160 steel, 1 mm leg rivet that has been subjected to a decarburization treatment, wherein the rivet has been flared to failure.
Figure 11A:
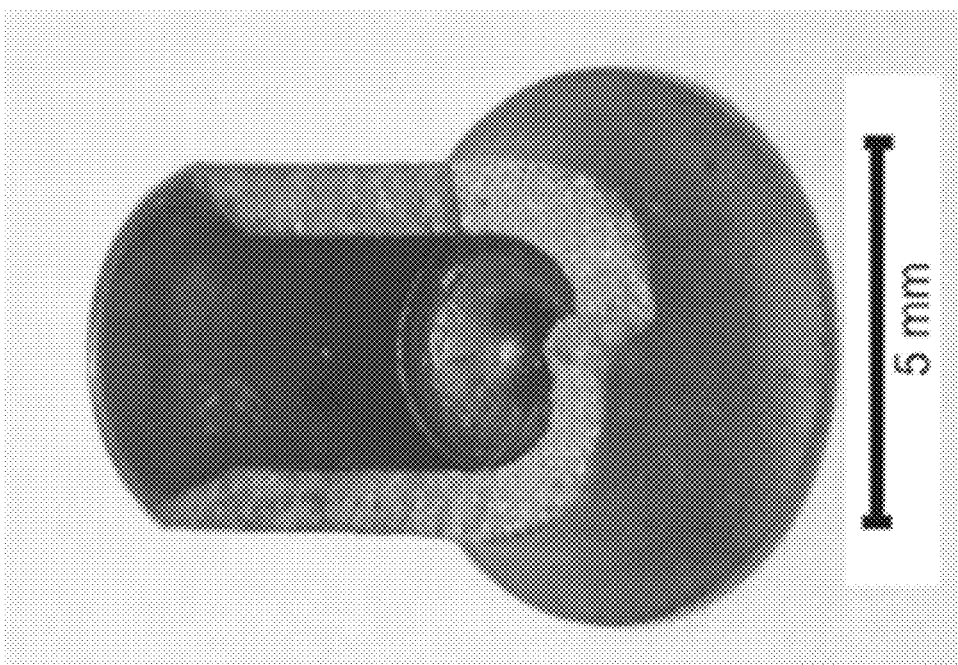
FIG. 11A is a perspective view of a 5160 steel, 1 mm leg rivet that has not been subjected to a decarburization treatment, wherein the rivet has been flared to failure.

Now referring to FIGS. 11A and 11B, perspective views of 5160 steel, 1 mm leg rivets are provided without a decarburization and with a decarburization treatment, respectively. The rivets that had not been decarburized were completely brittle, failing before any appreciable plastic deformation was imposed. In contrast, 5160 steel rivets that had been decarburized performed in an improved manner with a single large fracture with secondary fractures and regions of localized necking around the circumference of the rivet.

Figure 12:
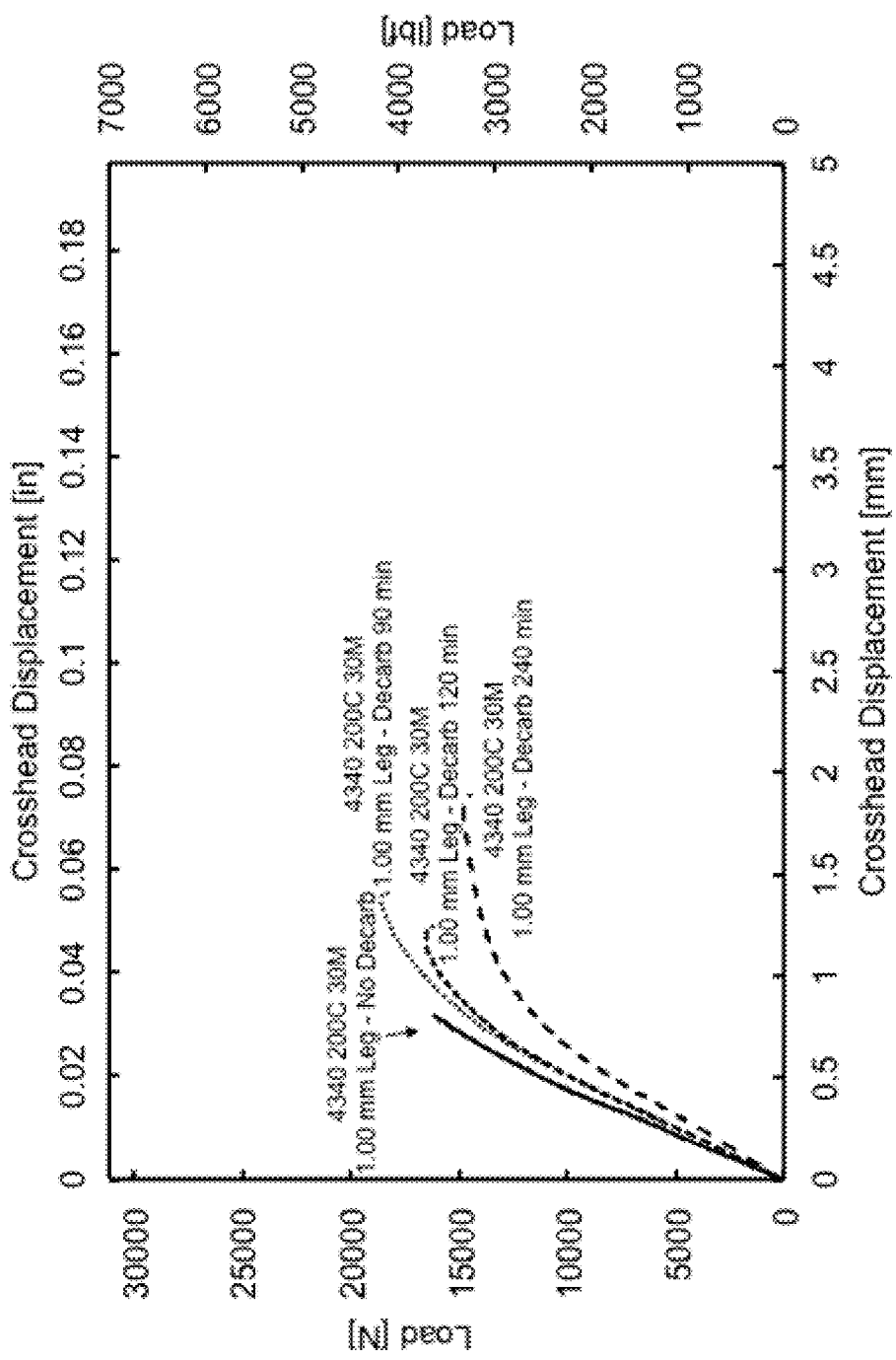
FIG. 12 is a chart depicting a mechanical flaring curve for 4340 steel, 1 mm leg rivets, wherein the rivets have different decarburization treatments and the rivet is flared with a 120° conical die.

Now referring to FIG. 12, a chart depicting a mechanical flaring curve for 4340 steel, 1 mm leg rivets is provided, and the rivets were flared using a 120° conical die. The 4340 steel rivets showed different trends when compared to 10B37 and 5160 steel rivets with less performance increases when a decarburized ferrite layer was applied. The 4340 steel rivets that had been decarburized for 90 minutes showed performance increases in both load and crosshead displacement to failure over rivets with no decarburization. However, as decarburization time increased, column strength decreased with no significant increase in crosshead displacement to failure.

Figure 13B:
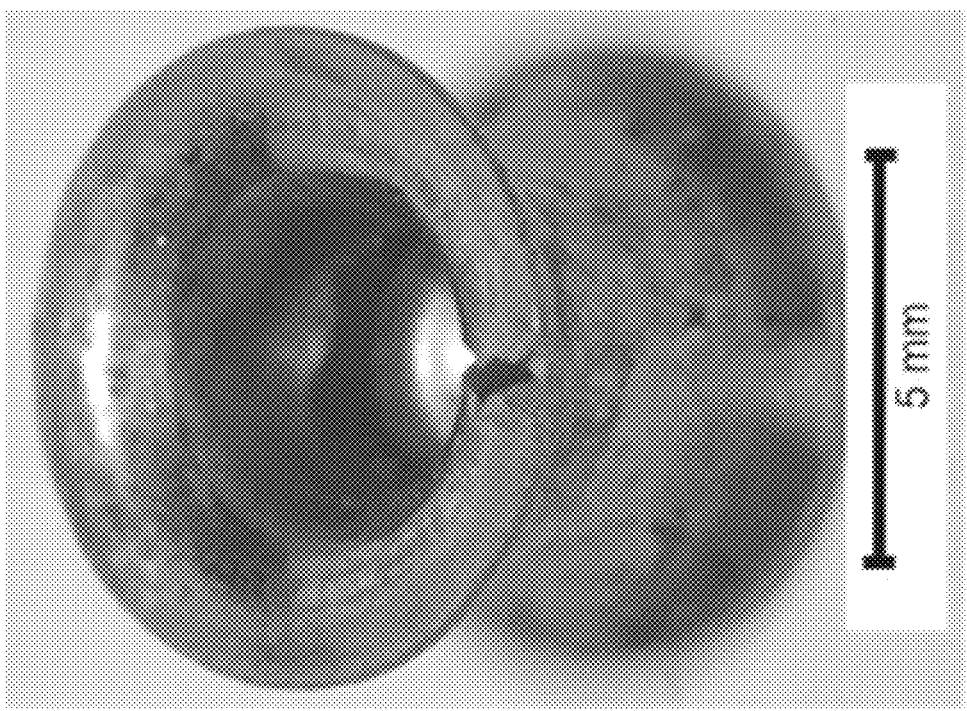
FIG. 13B is a perspective view of a 4340 steel, 1 mm leg rivet that has been subjected to a decarburization treatment, wherein the rivet has been flared to failure.
Figure 13A:
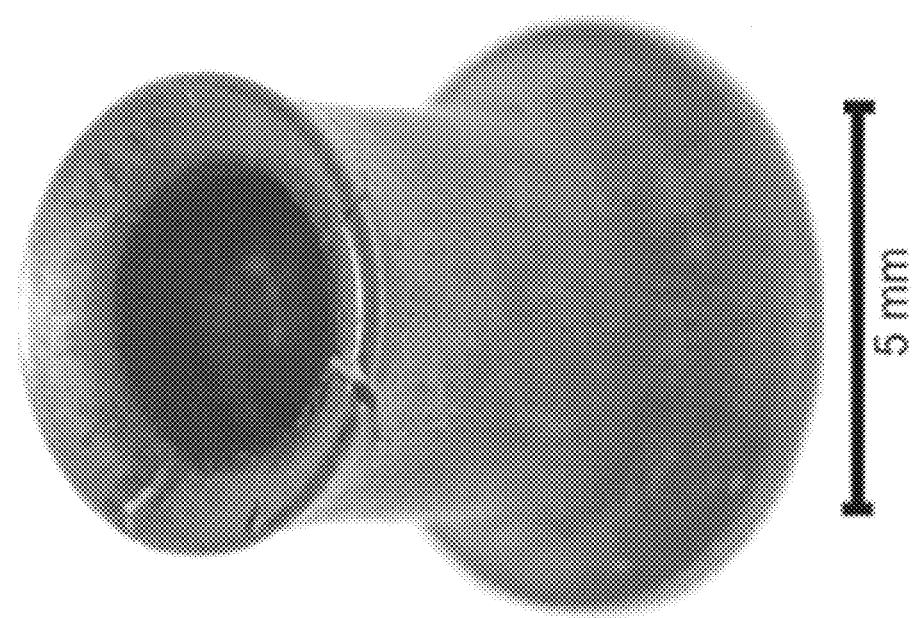
FIG. 13A is a perspective view of a 4340 steel, 1 mm leg rivet that has not been subjected to a decarburization treatment, wherein the rivet has been flared to failure.

Now referring to FIGS. 13A and 13B, perspective views of 4340 steel, 1 mm leg rivets are provided without a decarburization and with a decarburization treatment, respectively. Fractures in rivets with no decarburization were similar to those that occurred in 10B37 steel rivets with no decarburization. Decarburized rivets showed improvements in hole-expansion with a single large fracture. The differences in flaring behavior of 10B37 steel rivets and 5160 steel rivets when compared to 4340 steel rivets are a result of the surface microstructure obtained through heat-treatment. A ferrite layer forms on the surface of 10B37 and 5160 steel rivets after intentional decarburization and oil quenching. The higher hardenability of the 4340 results in a martensitic structure through the rivet with a reduced carbon content near the surface, resulting in an improvement in surface ductility and resulting hole-expansion ratio, although not to the same degree as the decarburized rivets with a ferrite surface layer.

Figure 15A:
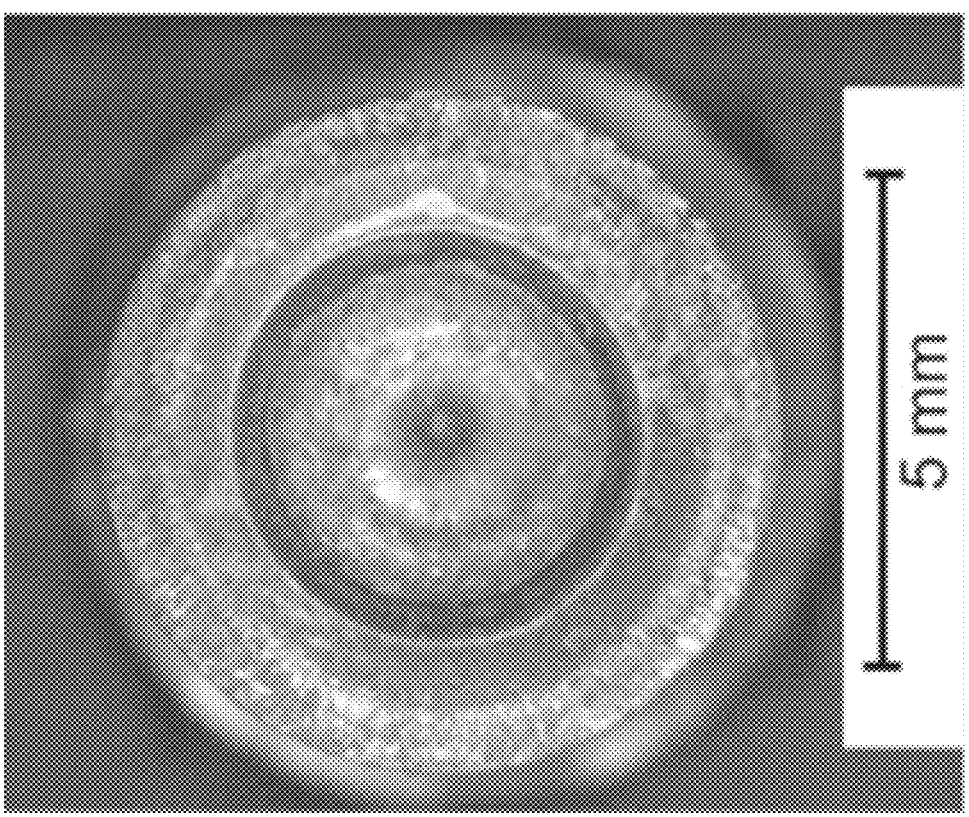
FIG. 15A is a bottom plan view of a 10B37 steel rivet, wherein the rivet has not been subjected to a decarburization treatment.
Figure 15B:
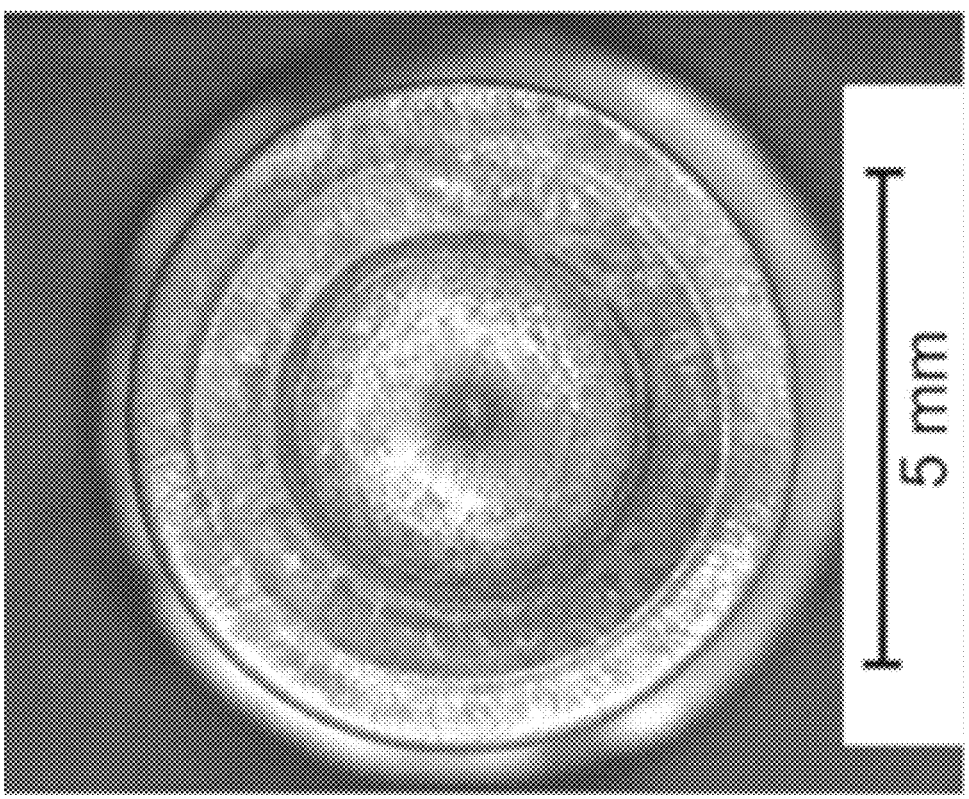
FIG. 15B is a bottom plan view of a 10B37 steel rivet, wherein the rivet has been subjected to a decarburization treatment.

FIGS. 14A-24B relate to joining tests where rivets were utilized to join sheets of material. Specifically, FIGS. 14A-18B relate to a press-hardened steel study where rivets with 1.25 mm legs were analyzed, and FIGS. 19A-24B relate to a commonization study where rivets with 1 mm legs were analyzed. Now referring to FIGS. 14A and 14B, cross-sectional views of 10B37 steel rivets joining sheets of materials are provided where the rivets are non-decarburized and decarburized, respectively. The decarburized rivets were decarburized for 60 minutes. In addition, bottom plan views of the non-decarburized and decarburized rivets are provided in FIGS. 15A and 15B, respectively. Integrating a decarburized layer prevents the formation of fractures along the rivet periphery that are present in the non-decarburized rivets but results in a decrease in column strength that results in leg buckling and thickening. The average interlock distance, or the distance between the outer surface of the rivet body and the lateral extent of the flared tail end, decreased from $0.59\pm0.04$ mm to $0.48\pm0.06$ mm after decarburization along with the legs increasing in thickness from $1.43\pm0.06$ mm to $1.53\pm0.05$ mm. Due to the relatively low strain demands on this particular rivet and joint combination, further optimization by reduction of the decarburized layer thickness to reduce fractures and promote adequate column strength may be possible.

Figure 16A:
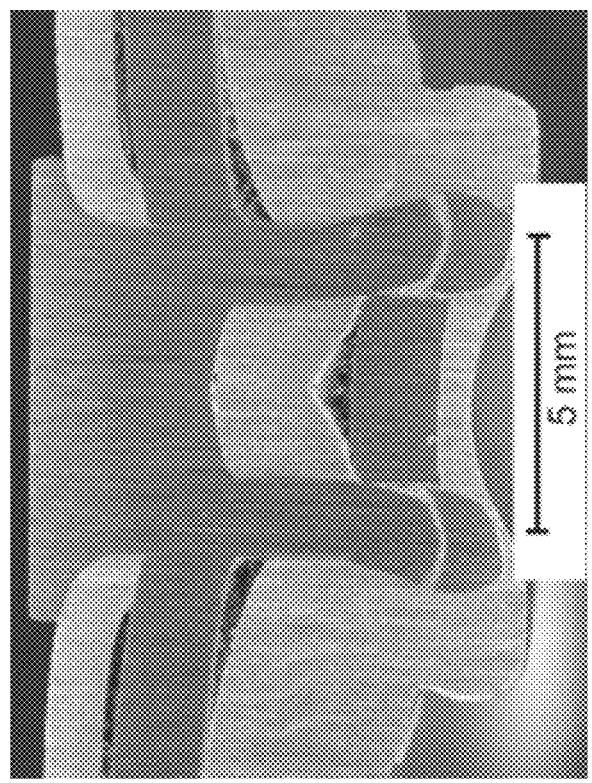
FIG. 16A is a cross-sectional view of a 4340 steel rivet joining sheets of materials, wherein the rivet has not been subjected to a decarburization treatment.
Figure 16B:
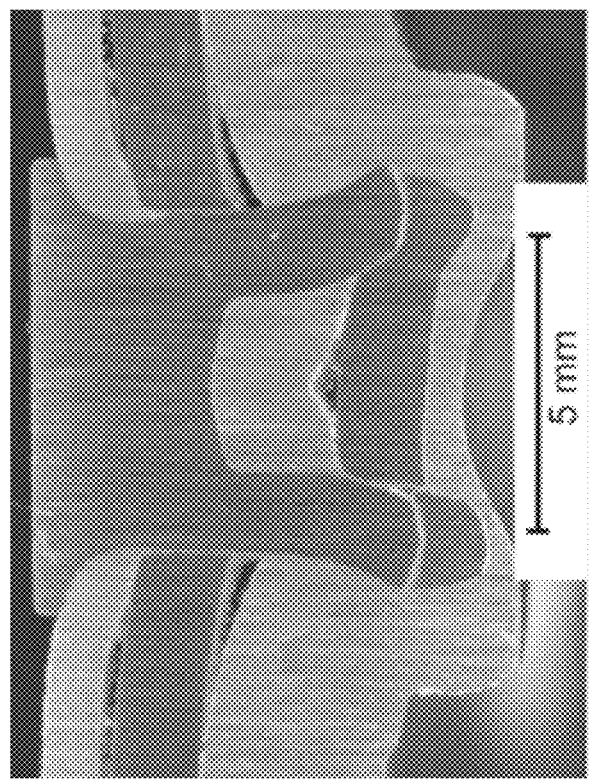
FIG. 16B is a cross-sectional view of a 4340 steel rivet joining sheets of materials, wherein the rivet has been subjected to a decarburization treatment.
Figure 17A:
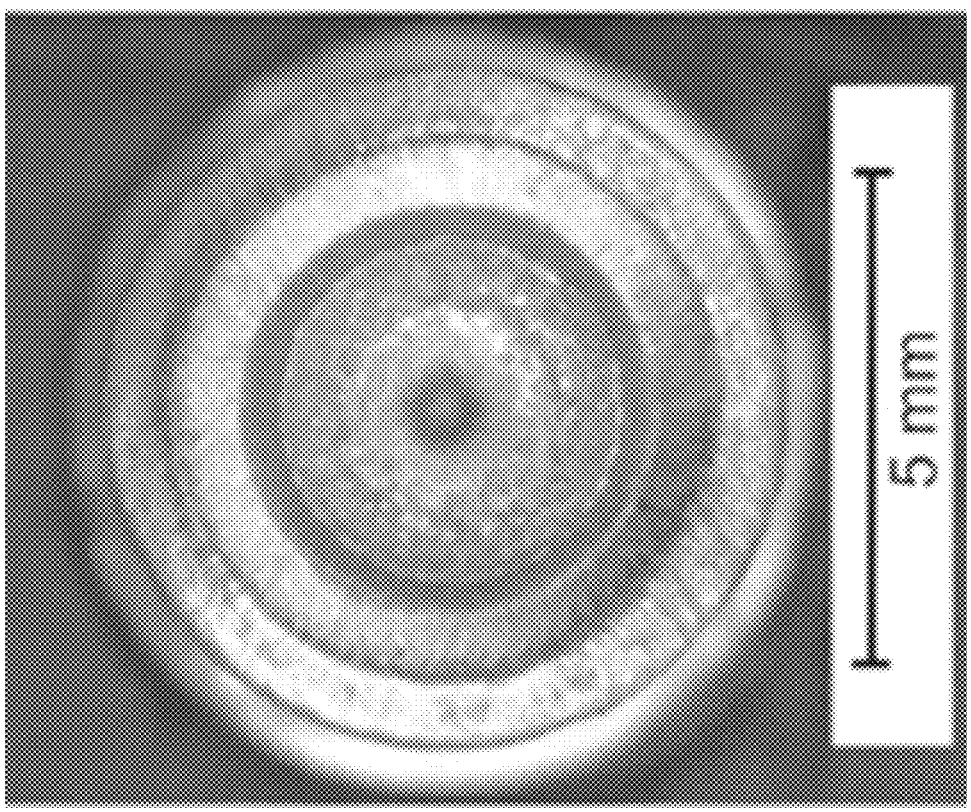
FIG. 17A is a bottom plan view of a 4340 steel rivet, wherein the rivet has not been subjected to a decarburization treatment.
Figure 17B:
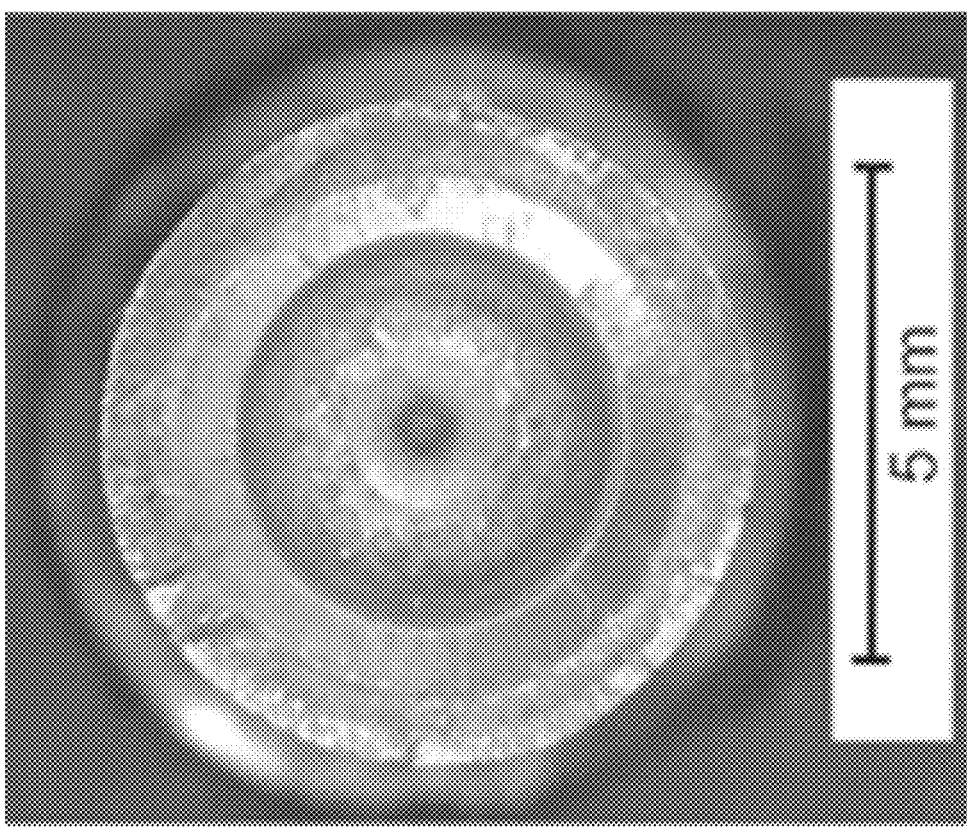
FIG. 17B is a bottom plan view of a 4340 steel rivet, wherein the rivet has been subjected to a decarburization treatment.

Now referring to FIGS. 16A and 16B, cross-sectional views of 4340 steel, 1 mm leg rivets joining sheets of materials are provided where the rivets are non-decarburized and decarburized, respectively. The decarburized rivets were decarburized for 90 minutes. In addition, bottom plan views of the non-decarburized and decarburized rivets are provided in FIGS. 17A and 17B, respectively. The average interlock distance for the non-decarburized 4340 steel rivets was $0.50\pm0.06$ mm and $0.60\pm0.10$ mm for the decarburized rivets, which was essentially equivalent to the non-decarburized 10B37 steel rivets. Leg thickness was also comparable between the non-decarburized 10B37 steel rivets and the decarburized 4340 steel rivets with an average leg thickness of $1.43\pm0.06$ mm and $1.42\pm0.09$ mm, respectively. When comparing the results to those obtained in the 10B37 steel experiments it appears the decarburized 4340 steel rivets prevented fractures at the rivet tail while also providing a successful junction with no significant buckling or thickening of the rivet legs. Non-decarburized 4340 steel rivets showed fractures at the rivet tail in agreement with results obtained from joining attempts using 10B37 steel rivets.

Figure 18B:
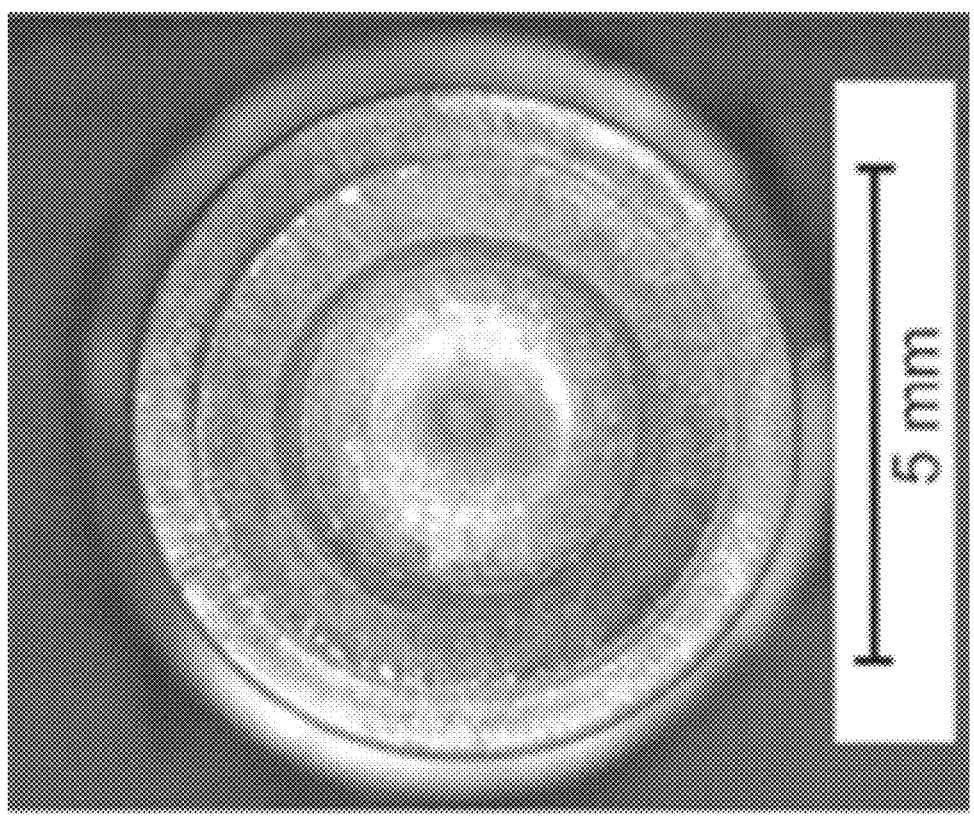
FIG. 18B is a bottom plan view of a 5160 steel rivet, wherein the rivet has been subjected to a decarburization treatment.
Figure 18A:
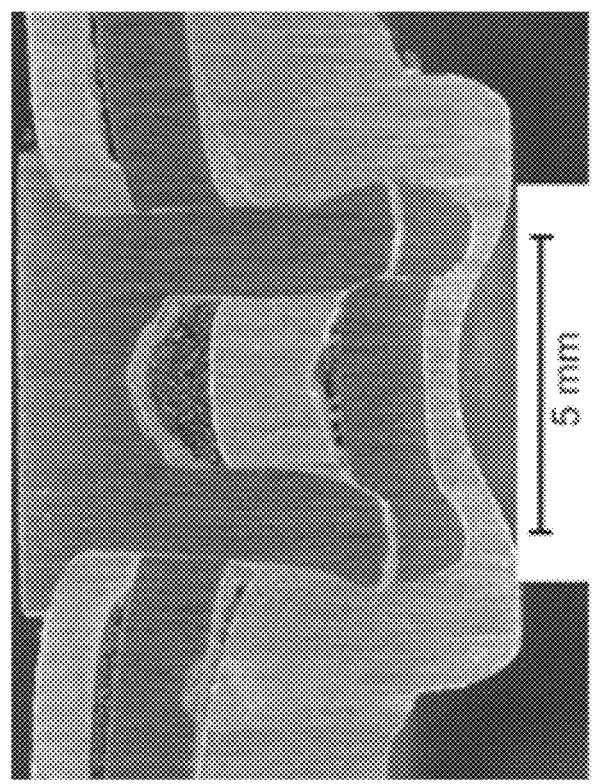
FIG. 18A is a cross-sectional view of a 5160 steel rivet joining sheets of materials, wherein the rivet has been subjected to a decarburization treatment.

Now referring to FIGS. 18A and 18B, a cross-sectional view of a decarburized 5160 steel rivet joining sheets of materials and a bottom plan view of a decarburized 5160 steel rivet are provided, respectively. The decarburized rivets were decarburized for 120 minutes. The 5160 steel rivets appear to buckle slightly with significant leg thickening, resulting in the greatest average leg thickness of $1.54\pm0.05$ mm. Average interlock distance was the lowest of all evaluated rivets as well with an average distance of $0.37\pm0.06$ mm. Additionally, the inability to cold-forge 5160 rivets into the 1.25 mm (0.049 in) leg thickness geometry further limits the applicability of this alloy as an alternative to 10B37 steel rivets in this specific case study.

Figure 19A:
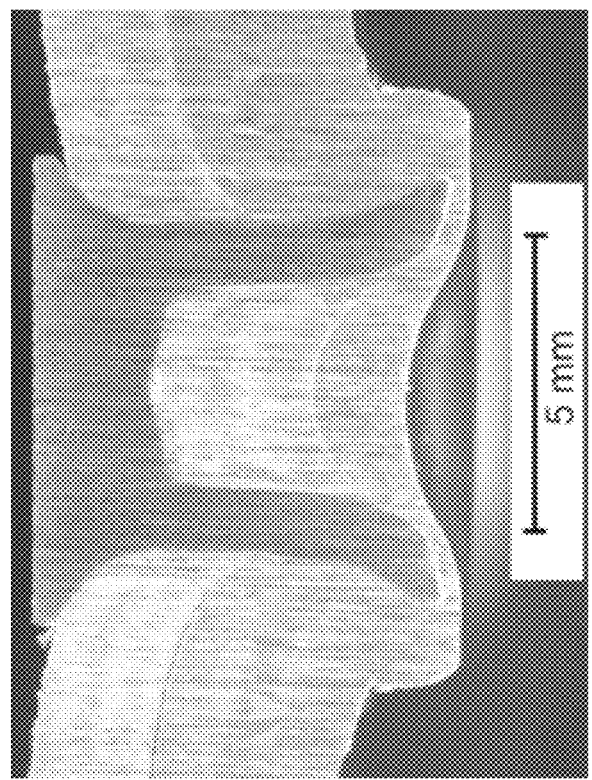
FIG. 19A is a cross-sectional view of a 10B37 steel rivet joining sheets of materials, wherein the rivet has not been subjected to a decarburization treatment.
Figure 19B:
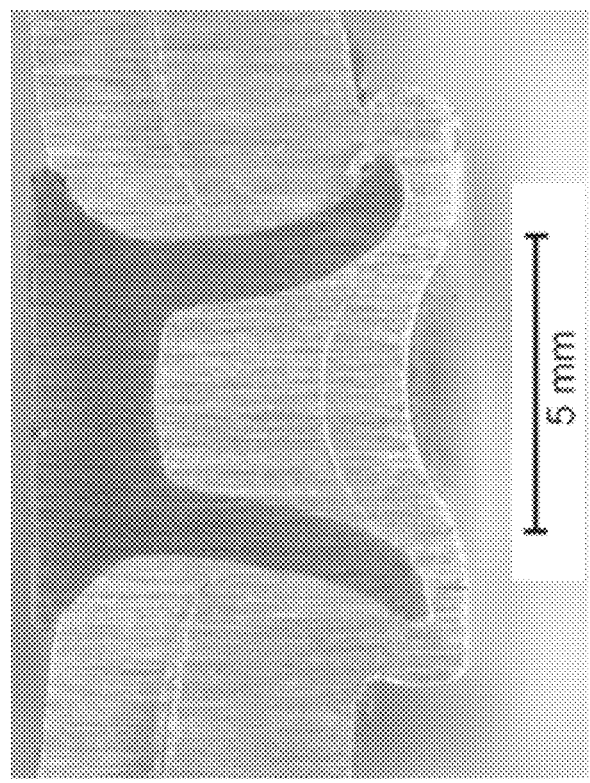
FIG. 19B is a cross-sectional view of a 10B37 steel rivet joining sheets of materials, wherein the rivet has been subjected to a decarburization treatment.
Figures 20A, 20B:
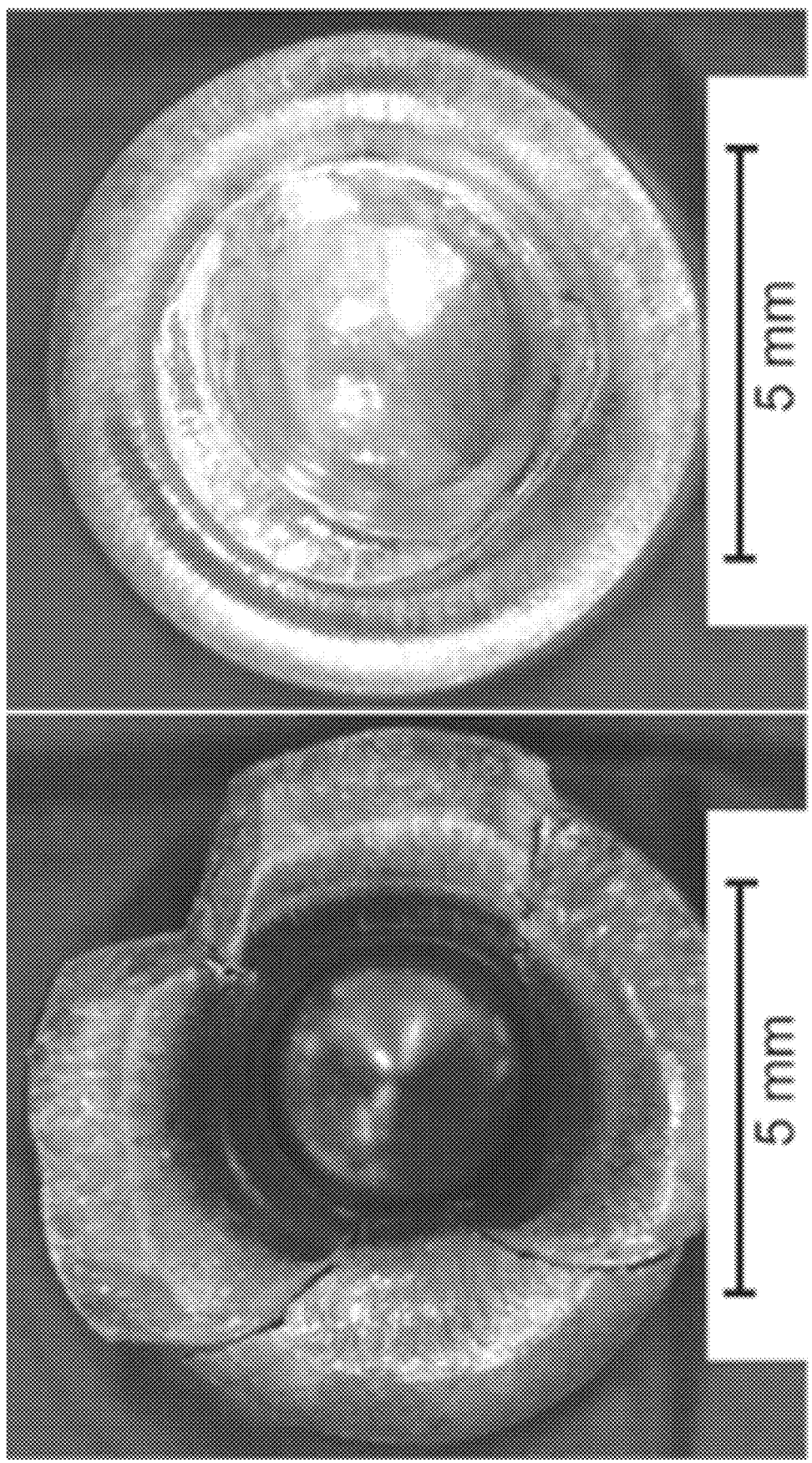
FIG. 20A is a bottom plan view of a 10B37 steel rivet, wherein the rivet has not been subjected to a decarburization treatment.
FIG. 20B is a bottom plan view of a 10B37 steel rivet, wherein the rivet has been subjected to a decarburization treatment.

Now referring to FIGS. 19A and 19B, cross-sectional views of 10B37 steel rivets joining sheets of materials are provided where the rivets are non-decarburized and decarburized, respectively. The decarburized rivets were decarburized for 60 minutes. In addition, bottom plan views of the non-decarburized and decarburized rivets are provided in FIGS. 20A and 20B, respectively. Non-decarburized 10B37 steel rivets exhibited asymmetrical flaring, indicative of a fracture in the rivet not shown in the cross-section plane. Integrating a decarburized ferrite layer provides a large performance increase over non-decarburized rivets. The addition of the decarburized layer prevents fracture during joining while not reducing the column strength of the rivet to the point that piercing of the sheet material or buckling of the rivet becomes an issue in this joining scenario, leading to an average interlock distance of $0.84\pm0.10$ mm. All decarburized 10B37 and 5160 steel rivets would be deemed successful joints, while all non-decarburized rivets would be classified as failures and not permitted for production.

Figure 21A:
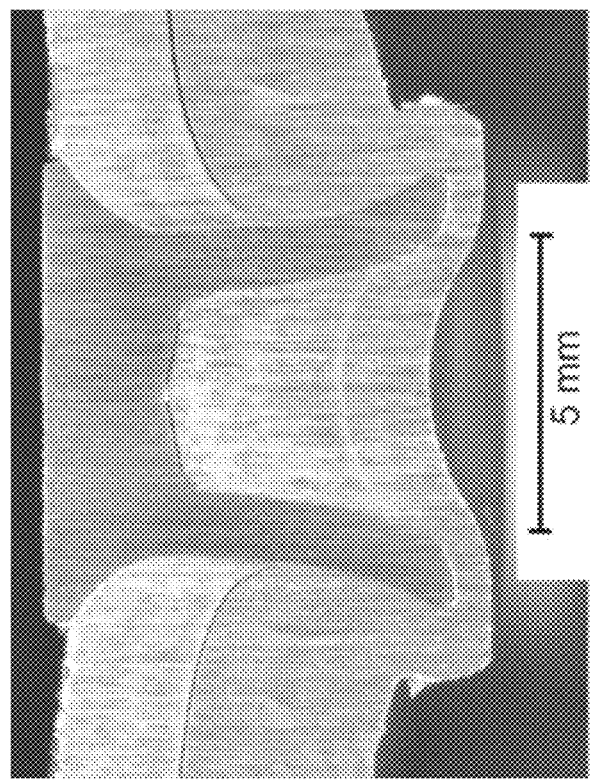
FIG. 21A is a cross-sectional view of a 4340 steel rivet joining sheets of materials, wherein the rivet has not been subjected to a decarburization treatment.
Figure 21B:
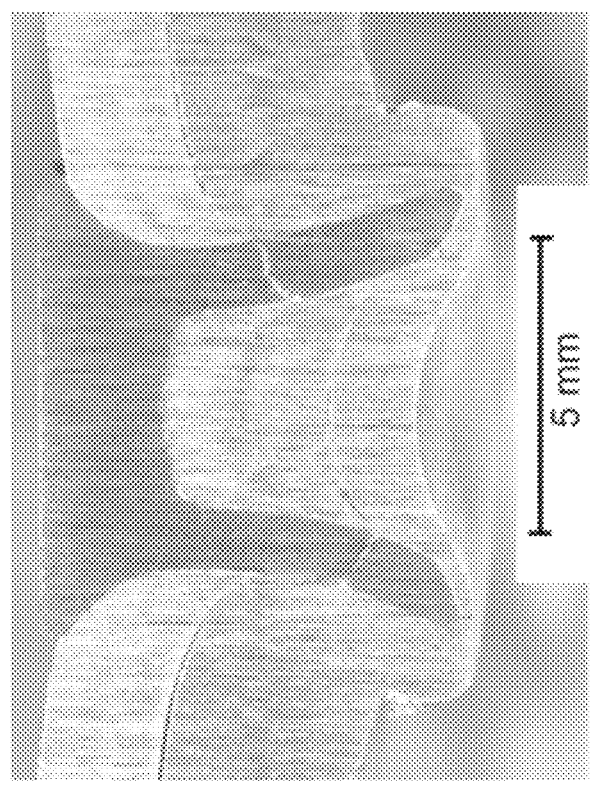
FIG. 21B is a cross-sectional view of a 4340 steel rivet joining sheets of materials, wherein the rivet has been subjected to a decarburization treatment.
Figure 22B:
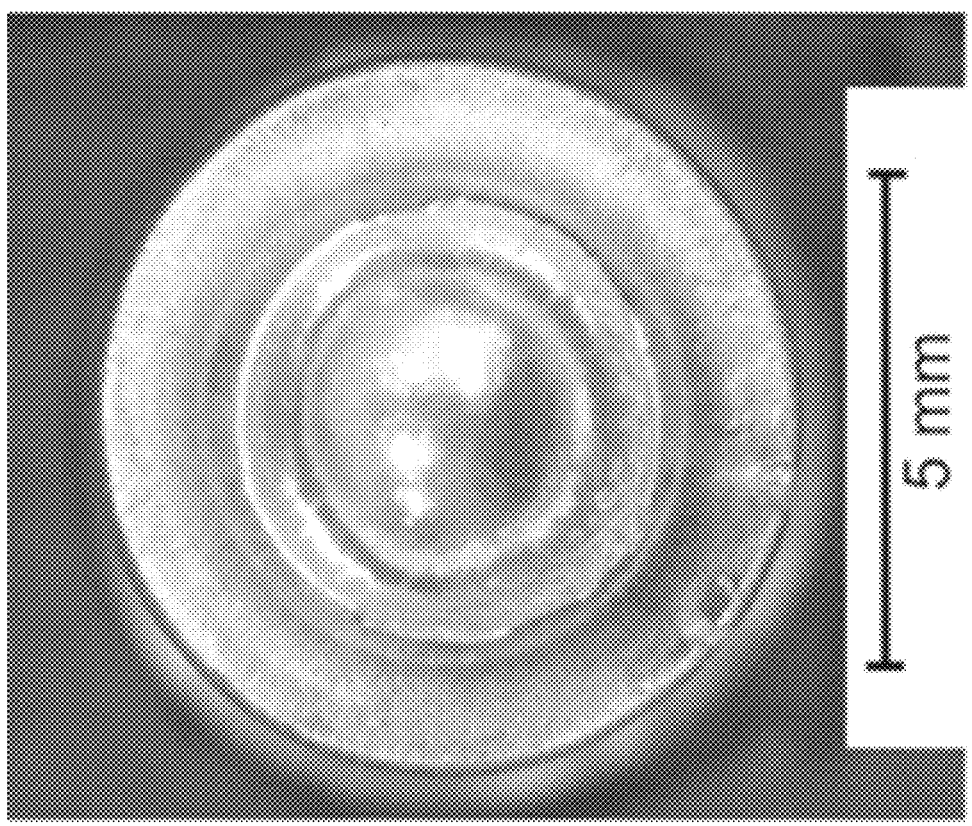
FIG. 22B is a bottom plan view of a 4340 steel rivet, wherein the rivet has been subjected to a decarburization treatment.
Figure 22A:
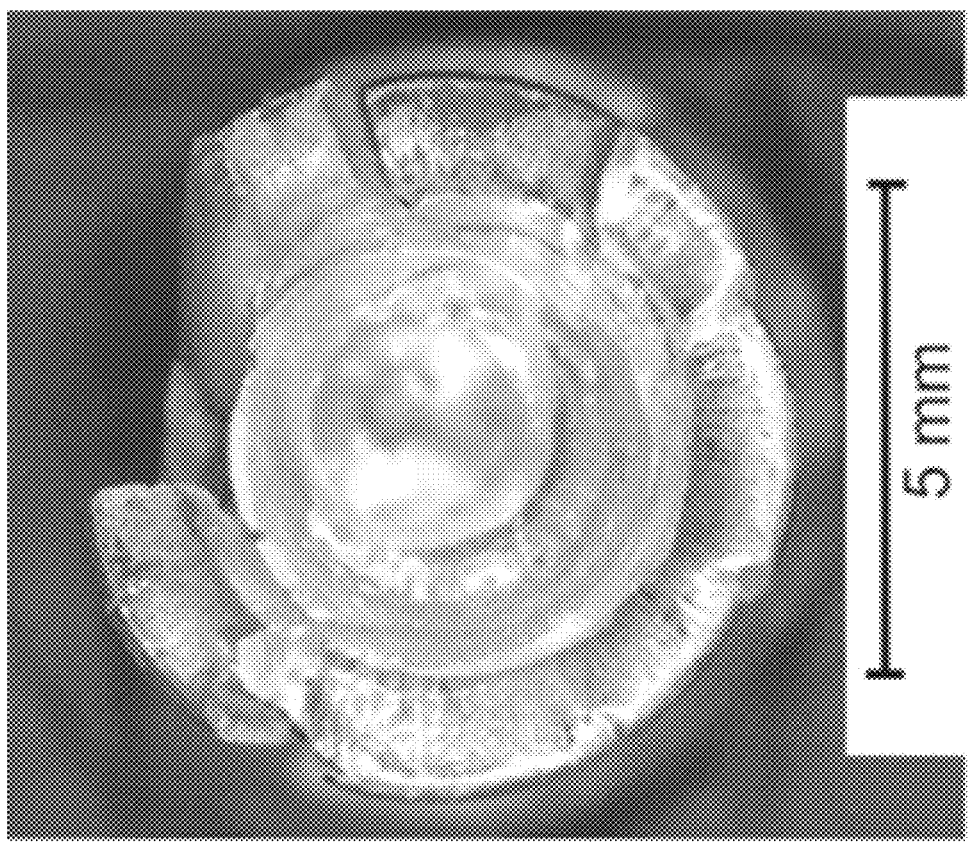
FIG. 22A is a bottom plan view of a 4340 steel rivet, wherein the rivet has not been subjected to a decarburization treatment.

Now referring to FIGS. 21A and 21B, cross-sectional views of 4340 steel rivets joining sheets of materials are provided where the rivets are non-decarburized and decarburized, respectively. The decarburized rivets were decarburized for 90 minutes. In addition, bottom plan views of the non-decarburized and decarburized rivets are provided in FIGS. 22A and 22B, respectively. The same trends that were noted in the 10B37 steel rivets translate to the 4340 steel rivets although fractures are not completely avoided in the decarburized condition with the appearance of small fractures around the circumference of the rivet tail. Average interlock distance was $0.78\pm0.06$ mm, the lowest of all decarburized conditions evaluated.

Figure 23A:
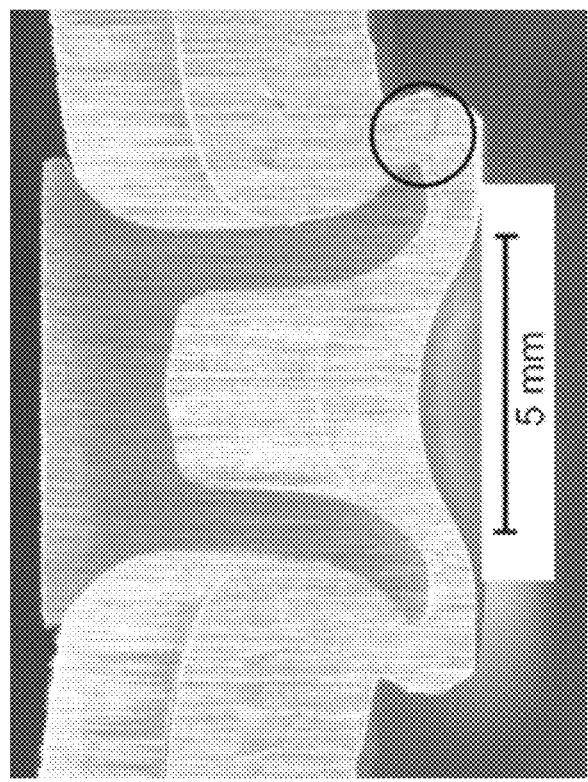
FIG. 23A is a cross-sectional view of a 5160 steel rivet joining sheets of materials, wherein the rivet has not been subjected to a decarburization treatment.
Figure 23B:
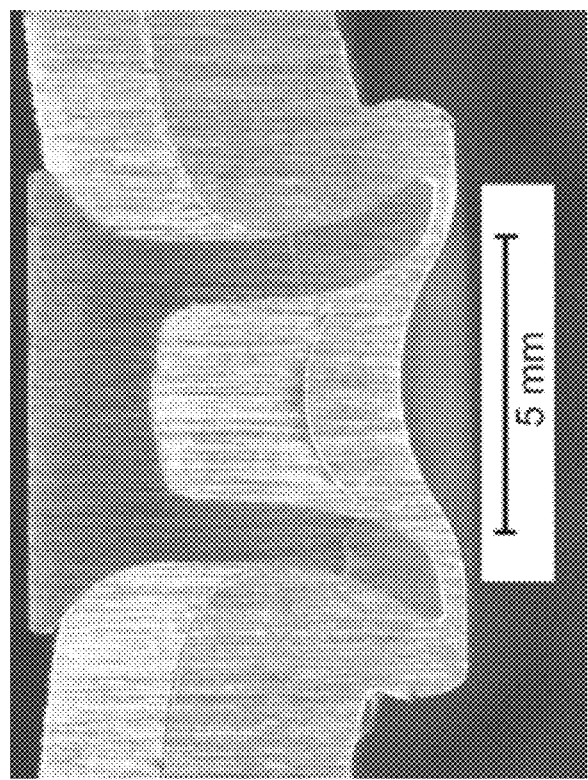
FIG. 23B is a cross-sectional view of a 5160 steel rivet joining sheets of materials, wherein the rivet has been subjected to a decarburization treatment.
Figures 24A, 24B:
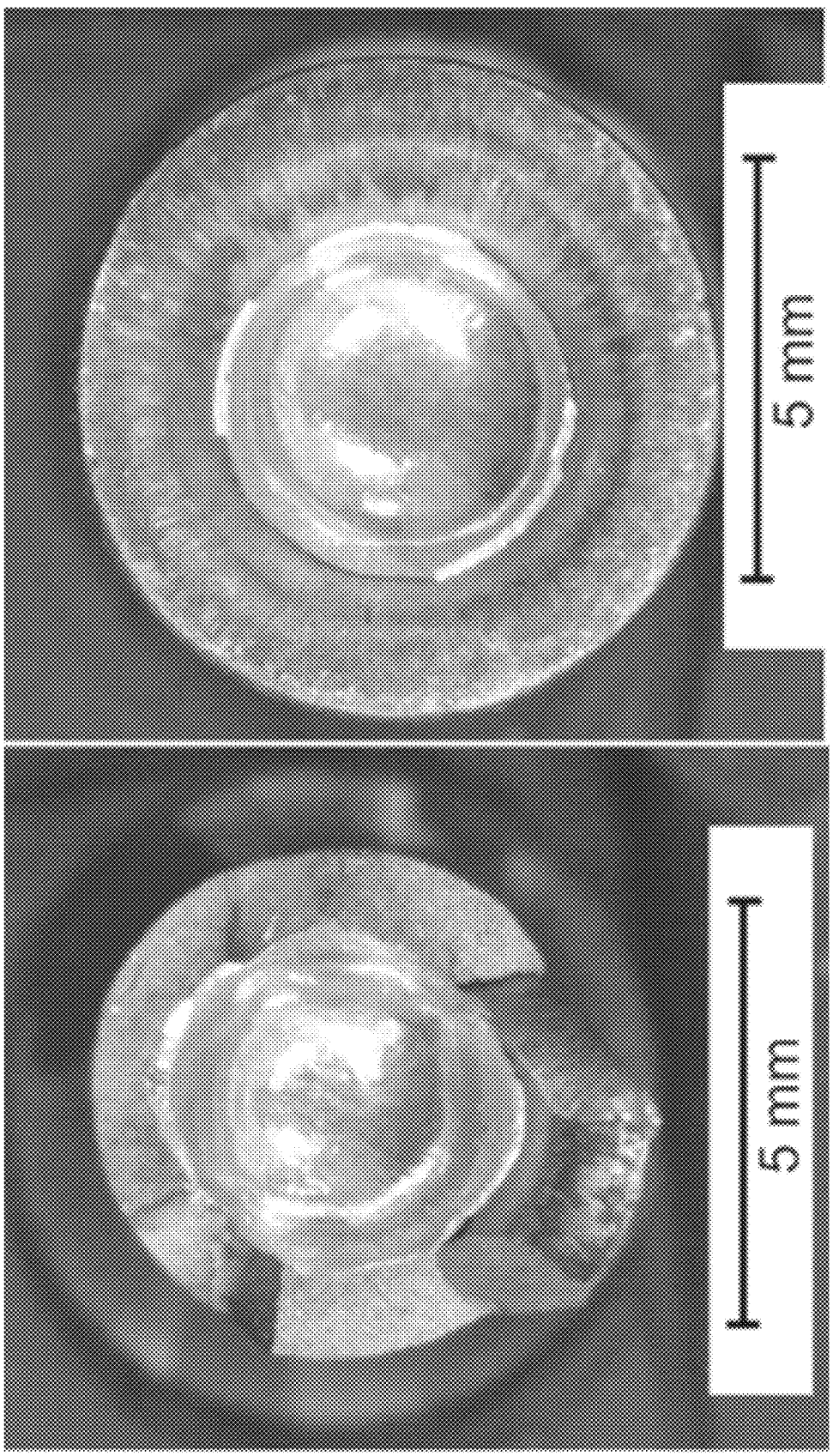
FIG. 24A is a bottom plan view of a 5160 steel rivet, wherein the rivet has not been subjected to a decarburization treatment.
FIG. 24B is a bottom plan view of a 5160 steel rivet, wherein the rivet has been subjected to a decarburization treatment.

Now referring to FIGS. 23A and 23B, cross-sectional views of 5160 steel rivets joining sheets of materials are provided where the rivets are non-decarburized and decarburized, respectively. The decarburized rivets were decarburized for 120 minutes. In addition, bottom plan views of the non-decarburized and decarburized rivets are provided in FIGS. 24A and 24B, respectively. The performance was very similar to that noted in the decarburized 10B37 steel rivets with brittle fracture of the non-decarburized 5160 steel rivets. The 5160 steel rivets showed the largest average interlock distance with $1.13\pm0.12$ mm. This led to instances of bottom substrate failure where cracks developed around the rivet circumference; these fractures can be avoided by alternative die selection. The decarburized 5160 steel rivets also exhibited a single, large fracture in one of the two extracted rivets, indicating a degree of unpredictability, which may be a result of the brittle nature of the bulk material. Increased tempering of the 5160 steel rivets may provide a reduction in brittle failure at the cost of reduced column strength.

The description of the present invention has been presented for purposes of illustration and description, but is not intended to be exhaustive or limiting of the invention to the form disclosed. Many modifications and variations will be apparent to those of ordinary skill in the art. The embodiments described and shown in the figures were chosen and described in order to best explain the principles of the invention, the practical application, and to enable those of ordinary skill in the art to understand the invention.

While various embodiments of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. It is to be expressly understood that such modifications and alterations are within the scope and spirit of the present invention, as set forth in the following claims.

The invention claimed is:

1. A method of manufacturing a self-piercing rivet, comprising:
   providing a rivet having a grip body, a head portion, and a tail portion, wherein an outer layer of said tail portion has a first carbon content;
   placing said rivet in a furnace at a predetermined temperature of between about 800 and 900° C.;
   austenitizing and decarburizing said rivet in said furnace at said predetermined temperature such that said outer layer of said tail portion has a second carbon content that is lower than said first carbon content;
   removing said rivet from said furnace after a predetermined time of between about 20 and 240 minutes; and
   quenching said rivet in a bath such that said outer layer of said rivet has a volume fraction of ferrite and a remaining bulk material of said rivet has a volume fraction of martensite that is greater than said volume fraction of ferrite.

2. The method of claim 1, wherein said furnace is a salt pot furnace.

3. The method of claim 2, wherein said salt pot furnace has a salt mixture of approximately 90% barium chloride and approximately 10% sodium chloride.

4. The method of claim 1, further comprising:
   tempering said rivet at a second predetermined temperature of between about 150 and 400° C. for a second predetermined time of between about 20 and 40 minutes.

5. The method of claim 1, further comprising applying an acetone wash to said rivet to remove salt.

6. The method of claim 4, wherein said bulk material and said outer layer of said rivet are at least one of a 10B37 steel and a 4340 steel, and said second predetermined temperature for tempering is between about 150 to 250° C., and said second predetermined time is approximately about 20 to 40 minutes.

7. The method of claim 4, wherein said bulk material and said outer layer of said rivet is a 5160 steel, and said second predetermined temperature for tempering is approximately about 300 to 400° C., and said second predetermined time is approximately about 20 to 40 minutes.

8. The method of claim 1, wherein said predetermined time for austenitizing and decarburizing is between about 50 to 70 minutes.

* * * * *